United States Patent
Hori et al.

(10) Patent No.: US 8,488,273 B2
(45) Date of Patent: Jul. 16, 2013

(54) MAGNETIC RECORDING/REPRODUCTION DEVICE FOR METAL-THIN-FILM MAGNETIC TAPE

(75) Inventors: Kenya Hori, Okayama (JP); Masaya Sakaguchi, Okayama (JP)

(73) Assignee: Panasonic Corporation, Osaka (JP)

( * ) Notice: Subject to any disclaimer, the term of this patent is extended or adjusted under 35 U.S.C. 154(b) by 456 days.

(21) Appl. No.: 12/989,222

(22) PCT Filed: Apr. 8, 2009

(86) PCT No.: PCT/JP2009/001623
§ 371 (c)(1),
(2), (4) Date: Oct. 22, 2010

(87) PCT Pub. No.: WO2009/130855
PCT Pub. Date: Oct. 29, 2009

(65) Prior Publication Data
US 2011/0043947 A1    Feb. 24, 2011

(30) Foreign Application Priority Data
Apr. 25, 2008  (JP) .................................. 2008-115052

(51) Int. Cl.
*G11B 5/127*    (2006.01)
(52) U.S. Cl.
USPC ......................................................... 360/128
(58) Field of Classification Search
USPC .............................. 360/110, 122, 130.23, 128
See application file for complete search history.

(56) References Cited

U.S. PATENT DOCUMENTS

| | | | |
|---|---|---|---|
| 5,396,383 A | 3/1995 | Gregory et al. | |
| 6,940,686 B2 | 9/2005 | Ohtani et al. | |

FOREIGN PATENT DOCUMENTS

| | | | |
|---|---|---|---|
| JP | 58023320 | * | 2/1983 |
| JP | 60083208 | * | 5/1985 |
| JP | 60136008 | * | 7/1985 |
| JP | 60147916 | * | 8/1985 |
| JP | 04109409 | * | 4/1992 |
| JP | 06-223533 | | 8/1994 |
| JP | 09-069215 | | 3/1997 |
| JP | 11-273037 | | 10/1999 |
| JP | 11-328636 | | 11/1999 |
| JP | 2001-229662 | | 8/2001 |
| JP | 2005-011455 | | 1/2005 |
| JP | 2006-134560 | | 5/2006 |

* cited by examiner

*Primary Examiner* — Angel Castro
(74) *Attorney, Agent, or Firm* — Hamre, Schumann, Mueller & Larson, P.C.

(57) ABSTRACT

There is provided a magnetic recording/reproduction device which can appropriately supply lubricant to a metal-thin-film magnetic tape (1) containing no binder in a recording/reproduction surface even when the magnetic recording/reproduction device needs to be continuously performing recording/reproduction by using the magnetic tape (1) for a long time. The magnetic recording/reproduction device includes a lubricant supplier (10) which can supply lubricant to the magnetic tape (1) while the magnetic head (2) performing recording/reproduction on the magnetic tape (1). With this configuration, the lubricant supplier (10) can appropriately supply lubricant during recording/reproduction even to the magnetic tape (1) used in a magnetic recording/reproduction device that needs to keep continuously operating for a long time.

16 Claims, 15 Drawing Sheets

MAGNETIC RECORDING/REPRODUCTION DEVICE FOR METAL-THIN-FILM MAGNETIC TAPE

TECHNICAL FIELD

The present invention relates to a magnetic recording/reproduction device configured to supply lubricant to a magnetic tape.

BACKGROUND ART

For magnetic recording/reproducing devices, a coated magnetic tape have been widely used, in which a substrate is coated with a magnetic layer containing lubricant and an abrasive together with a binder.

In a magnetic recording/reproduction device that uses a coated magnetic tape, the lubricant contained in the binder maintains lubricity between the surface of a magnetic head and the magnetic tape, and protects a magnetic film. In the magnetic recording/reproduction device of this type, however, there is a disadvantage that debris of the binder is generated by sliding of the magnetic tape over the magnetic head of the magnetic recording/reproduction device since the binder is contained in the magnetic tape. Consequently, dirt including debris of the binder becomes likely to stick to the magnetic head after a long time use of the magnetic recording/reproduction device, and the magnetic head needs to be cleaned to remove the dirt as appropriate. For example, Patent documents 1 and 2 disclose arrangements in which lubricant is added to a cleaning agent and the lubricant is supplied to the magnetic head together with the cleaning agent during cleaning of the magnetic head.

Patent document 1 discloses an arrangement in which a tank containing a cleaning agent that contains lubricant is provided in a cleaning cassette housing. The tank rotates contacting with a magnetic tape to supply the cleaning agent containing the lubricant to the magnetic tape. Patent document 2 proposes an arrangement in which a soft material impregnated with lubricant is used as a head cleaner, and when cleaning the magnetic head while the magnetic recording/reproduction device is not recording or reproducing, the soft material is switched and contacts with the magnetic head to supply the lubricant to a sliding portion of the magnetic head. The magnetic layer of the coated magnetic tape contains lubricant and the lubricant is supplied unless the magnetic layer has worn away. Therefore there is no great necessity to supply lubricant in addition to the lubricant contained in the magnetic tape.

Since the magnetic layer of the coated magnetic tape contains a binder, which is nonmagnetic material, improvement of the filing density of magnetic material is unfortunately limited by the binder and therefore it is difficult to increase the recording capacities of the coated magnetic tapes.

A magnetic tape which can be overcoming the drawback of the difficulty in increasing the recording capacity of the coated magnetic tape and achieving higher density magnetic recording has been proposed. The magnetic tape, called metal-thin-film magnetic tape, has a recording/reproduction surface that contains no binder. The magnetic tape has a nonmagnetic substrate made of a nonmagnetic material, such as polyester, polyamide or polyimide film, coated with a metal magnetic material such as a Co—Ni alloy, Co—Cr alloy, or Co—O alloy by using a thin-film formation technique such as metal plating, vacuum deposition, sputtering or ion plating.

This type of metal-thin-film magnetic tape has good magnetic characteristics such as coercivity and squareness ratio and its magnetic layer can be formed very thin. Accordingly, the metal-thin-film magnetic tape of this type has good electromagnetic conversion characteristics in a short-wavelength region and has remarkably low demagnetization during recording, and low thickness loss during reproduction. In addition, unlike the coated magnetic tape described previously, the magnetic layer of the metal-thin-film magnetic tape does not contain a nonmagnetic binder. Because of the absence of the nonmagnetic binder, the metal-thin-film magnetic tape has the advantage that the filling density of ferromagnetic metal particles (that is, the magnetic recording density) can be improved to increase the recording capacity, and various other advantages. Therefore, the metal-thin-film magnetic tapes are especially suitable for use as recording media that require huge recording capacities, such as recording media for magnetic recording/reproduction devices for data backup for servers.

Since the metal-thin-film magnetic tape contains no binder in its recording/production surface and it is difficult to contain lubricant and an abrasive in the magnetic layer of the metal-thin-film magnetic tape, the metal-thin-film magnetic tape includes a very thin protective layer on the magnetic layer and a very thin lubricant coat on the protective layer to provide lubricity. Since the recording/reproduction surface contains no binder, the metal-thin-film magnetic tape is less prone to dirt and therefore rarely needs cleaning, unlike the coated magnetic tape.

CITATION LIST

Patent Documents

Patent Document 1: Japanese Patent Laid-Open No. 2005-11455
Patent Document 2: Japanese Patent Laid-Open No.11-328636

DISCLOSURE OF THE INVENTION

Problems to be Solved by the Invention

Although the metal-thin-film magnetic tape which contains no binder in the recording/reproduction surface has the advantage that the recording capacity can be significantly increased, the metal-thin-film magnetic tape has the drawback in that the lubricant in the surface can be exhausted and the protective layer can be worn down by a huge number of repetitions of sliding after long-term continuous use of the magnetic tape. Decrease in lubricity of the magnetic tape causes a serious problem such as damage to the magnetic layer. On the other hand, if an excessive amount of lubricant is supplied, serious problems can be caused. For example, due to the meniscus phenomenon, the magnetic tape becomes likely to be entangled around the magnetic head which contacts with the surface of the tape excessively supplied with lubricant; mobile droplets or dust of excessive lubricant can adhere to a part of the magnetic recording/reproduction device or the tape cartridge that does not need lubrication, the adhered lubricant droplets or dust absorb non-lubricant dust, and the dust that are clots of the lubricant and the lubricant that absorbed non-lubricant dust are then transferred to the magnetic head and the recording/reproduction surface of the magnetic tape to cause dropouts (data losses); and other serious problems can be caused.

One possible way to address the problem may be to apply the technique disclosed in Patent documents 1 and 2 in which lubricant is added to a cleaning agent and the agent containing the lubricant is supplied to the magnetic head or other part during cleaning (while recording/reproduction is turned off) to a magnetic recording/reproduction device that uses a metal-thin-film magnetic tape that contains no binder in its recording/reproduction surface. However, when a metal-thin-film magnetic tape is used, binder debris does not adhere to the magnetic head and the head does not need to be cleaned. Therefore, the method of supplying lubricant added to a cleaning agent to the head during cleaning cannot be used. A method in which an agent containing lubricant is supplied to a magnetic head or other part in a period during which recording/reproduction is turned off, which is not for cleaning, also poses a problem. That is, if the method is used for a magnetic recording/reproduction device that need to kept continuously operating, such as a magnetic recording/reproduction device for data backup for a server, the period during which the device is not recording nor reproducing is so short that a sufficient amount of lubricant cannot be supplied to the magnetic head.

The present invention solves the problems and trouble described. An object of the present invention is to provide a magnetic recording/reproduction device which can be appropriately supplying lubricant to a metal-thin-film magnetic tape containing no binder in its recording/reproduction surface even when the magnetic recording/reproduction device needs to be continuously performing recording/reproduction by using the magnetic tape for a long time.

Means for Solving the Problems

To solve the problems and trouble described previously, the present invention provides a magnetic recording/reproduction device which supplies lubricant to a metal-thin-film magnetic tape containing no binder in recording/reproduction surface. The magnetic recording/reproduction device includes a lubricant supplier which can supply lubricant to the magnetic tape during recording and reproduction on the magnetic tape by means of the magnetic head.

With this configuration, since lubricant can be supplied to the magnetic tape by the lubricant supplier during recording/reproduction, lubricant can be appropriately supplied even to a magnetic tape used in a magnetic recording/reproduction device that has to keep continuously performing recording/reproduction.

According to the present invention, a rotating post sliding over the magnetic tape while rotating, and the lubricant supplier has a portion which contacts with the rotating post and supplies the lubricant to the magnetic tape through the rotating post.

With this configuration, the rotating post can be brought into contact with the magnetic tape with a even pressure across the width of the tape. Therefore, lubricant can be appropriately supplied through the rotating post while the rotating post is in contact with the magnetic tape evenly across the width of the magnetic tape. Specifically, a just enough amount of lubricant can be supplied without supplying either too much or too little because lubricant is not supplied unevenly.

According to the present invention, the magnetic head which slides over the magnetic tape and supplies the lubricant to the magnetic tape, and the lubricant supplier has a portion which contacts with the magnetic head and supplies the lubricant to the magnetic tape through the magnetic head.

With this configuration, since the magnetic head can also be used as a part of the lubricant supplier, a rotating head dedicated to supplying lubricant does not need to be separately provided. This can simplify the configuration of a magnetic recording/reproduction device that has a rotating type (helical-scan type) magnetic head.

The lubricant supplier according to the present invention has a contact-surface lubricant coat formed on a surface contacting with the magnetic head and a noncontact-surface lubricant coat formed contiguously with the contact-surface lubricant coat. The noncontact-surface lubricant coat is configured so that lubricant contained in the noncontact-surface lubricant coat melts at a temperature higher than or equal to a melting point of the lubricant to move and be supplied to the contact-surface lubricant coat, wherein the amount of lubricant supplied to the magnetic head is according to the decreasing amount of lubricant in contact-surface lubricant coat supplied to the magnetic head.

With this configuration, a proper amount of lubricant can be supplied to the surface of the magnetic head because lubricant in the noncontact-surface lubricant coat moves and is supplied to the contact-surface lubricant coat according to the amount of supply of lubricant from the contact-surface lubricant coat to the magnetic head.

The lubricant supplier according to the present invention includes a flexible thin-plate having a lubricant coat formed on a surface. The flexible thin-plate is configured so that the surface on which the lubricant coat is formed faces to the magnetic head and, and a first portion of the surface on which the lubricant coat is formed comes into contact with the magnetic head, and the contact-surface lubricant coat is formed on the first portion, and that a second portion does not contact with the magnetic head, and the noncontact-surface lubricant coat is formed on the second portion. With this configuration, the flexible sheet can flexibly conform to the shape of the contact surface of the magnetic head.

The lubricant supplier according to the present invention is configured as a solid block including at least one projection on which a lubricant coat is formed on a surface so that the projection faces to the magnetic head and comes into contact with the magnetic head, and the contact-surface lubricant coat is formed on the projection, and the lubricant supplier has a portion of the lubricant coat that does not contact the magnetic head, and the noncontact-surface lubricant coat is formed on the portion. With this configuration, a sufficient pressure can be applied to the magnetic head as compared with the sheet lubricant supplier.

The lubricant supplier according to the present invention contains one lubricant or a plurality of lubricants having different melting points from each other. The melting point of the one lubricant or at least one of the plurality of lubricants is higher than or equal to 28° C. With this configuration, lubricant is prevented from melting at room temperature in a non-operating state while the lubricant melts at a temperature in an operating ambience.

The lubricant supplier according to the present invention includes a removable cartridge containing lubricant. With this configuration, when lubricant is exhausted, the cartridge containing lubricant can be attachable and replaced to readily supply lubricant.

The lubricant supplier according to the present invention includes a movable part which can be switching between a suppling position in which the lubricant supplier can supply the lubricant to the magnetic tape and a non-suppling position in which the lubricant supplier does not supply the lubricant to the magnetic tape. With this configuration, the movable part can switch between the supply position and non-supply position to supply lubricant only when supply of lubricant is required.

The lubricant supplier according to the present invention includes a plurality of lubricants having different melting points, and contains a temperature sensor which senses temperature in a location where the lubricant supplier is disposed, supplies lubricant selected according to the temperature sensed by the temperature sensor. With this configuration, a lubricant can be appropriately selected and supplied to the magnetic tape for the temperature of the location where the lubricant supplier is disposed.

The lubricant supplier according to the present invention includes a plurality of supplying surfaces containing respective lubricants having different melting points, and the plurality of supplying surface being arranged so that the area of the supplying surface on which the lubricant is melted can be changed according to the temperature in the location the lubricant supplier.

With this configuration, a larger amount of lubricant can be supplied when for example the temperature is high.

The lubricant supplier according to the present invention constantly supplies the lubricant to the magnetic tape. With this configuration, lubricant can be constantly supplied to the magnetic tape.

The lubricant supplier according to the present invention supplies the lubricant to the magnetic tape at regular intervals.

The lubricant supplier according to the present invention supplies the lubricant to the magnetic tape according to operating time of the magnetic recording/reproduction device. With this configuration, lubricant can be supplied to the magnetic tape after the magnetic recording/reproduction device has operated for a long time. Since lubricant is not supplied to the magnetic tape until the magnetic recording/reproduction device has operated for a long time, lubricant can be saved. In addition, lubricant is prevented from being excessively supplied to a magnetic tape that is likely to have a sufficient level of protective layer containing lubricant because the magnetic recording/reproduction device has operated only a short time.

The lubricant supplier according to the present invention supplies the lubricant to the magnetic tape according to a length which the magnetic tape has traveled. With this configuration, lubricant can be supplied to the magnetic tape after the magnetic tape has traveled a long length. Since, lubricant is not supplied to the magnetic tape until the magnetic tape has traveled a long length, lubricant can be saved. In addition, lubricant is prevented from being excessively supplied to a magnetic tape that is likely to have a sufficient level of protective layer containing lubricant because the magnetic tape has traveled only a short length.

The lubricant supplier according to the present invention supplies the lubricant to the magnetic tape according to at least one of a type of the magnetic tape and a manufacturing date of the magnetic tape. With this configuration, the lubricant can be supplied at a timing when lubricant possibly need to be supplied, on the basis of conditions suitable for the type of the magnetic tape or the time elapsed since the date of manufacture of the magnetic tape.

The lubricant supplier according to the present invention supplies the lubricant to the magnetic tape according to tension of the magnetic tape. With this configuration, since supply of lubricant can be started or the lubricant supply time can be increased after the tension of the magnetic tape has increased, lubricant can be saved compared with a case that constantly supplies lubrication to the magnetic tape. In addition, lubricant is prevented from being excessively supplied to a magnetic tape that is likely to have a sufficient level of protective layer containing lubricant because the tension of the magnetic tape is appropriate.

The lubricant supplier according to the present invention supplies the lubricant to the magnetic tape according to a load on a motor for moving the magnetic tape, that is, as the load on the motor increases, the duration over which the lubricant is supplied is increased. With this configuration, since lubricant does not need to be supplied when the load on the motor is small, lubricant can be saved. In addition, lubricant is prevented from being excessively supplied to a magnetic tape that is likely to have a sufficient level of protective layer containing lubricant because the load on the motor is small.

Advantageous Effects of the Invention

According to the present invention, since the lubricant supplier which can be supplying lubricant to a magnetic tape while the magnetic tape is performing recording/reproduction on the magnetic head is provided, lubricant can be appropriately supplied to the magnetic tape even in a magnetic recording/reproduction device that needs to keep continuously operating.

Furthermore, by supplying lubricant to the magnetic tape through the rotating post rotatably supported, lubricant can contact with the magnetic tape with an even pressure across the width of the magnetic tape through the rotating post, and the lubricant can be supplied appropriately while the lubricant is in contact with the magnetic tape evenly across the width of the magnetic tape. Thus, a just enough lubricant can be supplied without supplying either too much or too little.

Moreover, by using the magnetic head also as a part of the lubricant supplier, the configuration of the magnetic recording/reproduction device can be simplified as compared with a device that uses a separate rotating head dedicated to supplying lubricant.

The lubricant supplier is formed by a flexible sheet having a surface on which a lubricant coat is formed, in such a manner that the surface on which the lubricant coat is formed faces to the magnetic head and a portion of the surface on which the lubricant coat is formed comes into contact with the magnetic head to function as a contact-surface lubricant coat, and that a portion that does not contact the magnetic head functions as a noncontact-surface lubricant coat. With this configuration, the flexible sheet can flexibly conform to the shape of the contact surface of the magnetic head.

EMBODIMENTS OF THE INVENTION

Embodiments of the present invention will be described with reference to drawings.

(First Embodiment)

Figure 1:
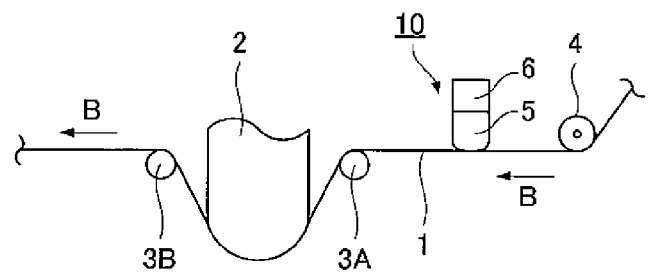
FIG. 1 is a plan view schematically illustrating a configuration of a lubricant supplier and its neighboring section in a magnetic recording/reproduction device according to a first embodiment of the present invention.

FIG. 1 is a plan view schematically illustrating a configuration of a subject part (a lubricant supplier and its neighboring section, which will be described later) of a magnetic recording/reproduction device according to a first embodiment of the present invention.

As illustrated in FIG. 1, the magnetic recording/reproduction device includes a magnetic head 2 which performs recording and reproduction on a metal-thin-film magnetic tape 1 containing no binder, plural (two in FIG. 2) guide posts 3A, 3B which guide the magnetic tape 1 so that the magnetic tape 1 slides over the magnetic head 2 during recording and reproduction, a rotating post 4 which guides the magnetic tape 1 to transfer the magnetic tape 1 to the guide post 3A located upstream with respect to the tape traveling direction (direction indicated by arrow B in FIG. 1), and a lubricant supplier 10 which is disposed in a position where it contacts with the recording/reproduction traveling path of the magnetic tape 1 and supplies lubricant to the magnetic tape 1 during the magnetic head 2 is performing recording/reproduction on the magnetic tape 1.

The lubricant supplier 10 in the embodiment includes an absorbent elastic spongy lubricant applicator 5 impregnated with lubricant and a supporting member 6 which supports the lubricant applicator 5 in such a manner that the lubricant applicator 5 protrudes to the traveling path of the magnetic tape 1 during recording and reproduction. However, the configuration of the lubricant supplier 10 is not limited to this. The lubricant applicator 5 may be of cartridge type which can be removable from the supporting member 6 but is not limited to the type. The metal-thin-film magnetic tape 1 containing no binder in its recording/reproduction surface may be one in which a nonmagnetic substrate made of a nonmagnetic material, such as polyester, polyamide or polyimide film is coated with a metal magnetic material such as a Co—Ni alloy, a Co—Cr alloy, or Co—O alloy by a thin-film formation technique such as metal plating, vacuum deposition, sputtering or ion plating.

With this configuration, a metal-thin-film magnetic tape 1 on which a larger amount of data can be recorded can be used while the lubricant supplier 10 can constantly supply the lubricant to the magnetic tape 1 during recording/reproduction. Therefore lubricant can also be appropriately supplied to a magnetic tape 1 used in a magnetic recording/reproduction device that needs to keep continuously operating. If a cartridge-type lubricant applicator 5 that can be removable from the supporting member 6 is used, the lubricant applicator 5 impregnated with lubricant cartridge can be readily replaced with a new one when the lubricant is exhausted, thereby readily supplying lubricant contained in the lubricant applicator 5.

The lubricant supplier 10 illustrated in the present embodiment is disposed so as to supply lubricant to a position upstream with respect to the tape traveling direction in the recording/reproduction traveling path from the position where the tape slides over the magnetic head 2. This is preferable because the magnetic tape 1 slides over the magnetic head 2 immediately after being supplied with lubricant. However, the position is not limited to this. The lubricant supplier 10 may be disposed in any position along the recording/reproduction traveling path. For example, the lubricant supplier 10 may be disposed so as to supply lubricant to a position downstream with respect to the magnetic tape traveling direction from the magnetic head 2. In a magnetic recording/reproduction device in which the magnetic tape 1 travels in both directions during recording and reproduction, the lubricant supplier may be disposed in any position along the traveling path. That is, the lubricant supplier 10 may be disposed in any position along the recording/reproduction traveling path where the lubricant supplier 10 can contact with the magnetic tape. The present embodiment has the advantage that lubricant supplier 10 can be disposed in any such position desired.

(Second Embodiment)

If a lubricant applicator 5 that protrudes to the recording/reproduction traveling path and directly contacts with the magnetic tape 1 is provided as a lubricant supplier 10 as in the first embodiment, the lubricant applicator 5 can partially come into contact with the magnetic tape 1 and supply lubricant to the magnetic tape 1 with an uneven pressure across the width of the magnetic tape 1, depending on the attitude of the lubricant applicator 5 in contact with the magnetic tape 1. If this is the case, lubricant may be supplied excessively or insufficiently to the magnetic tape 1, depending on the position where the lubricant applicator 5 is in contact, which can lead to a problem. For example, a proper amount of lubricant cannot be supplied to the magnetic tape 1 or the magnetic tape 1 can become more likely to be entangled around the magnetic head 2. Worse yet, the magnetic tape 1 can be damaged, depending on the condition in which the lubricant applicator 5 is in contact with the magnetic tape 1.

Figure 2:
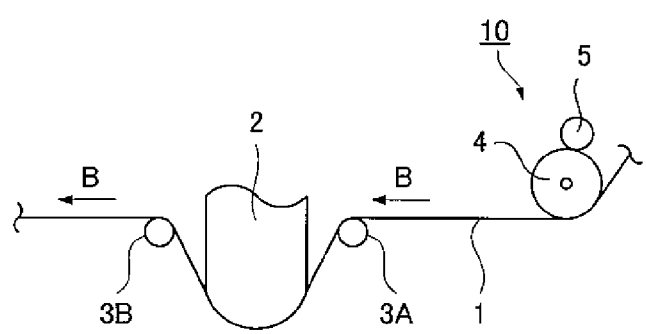
FIG. 2 is a plan view schematically illustrating a configuration of a lubricant supplier and its neighboring portion in a magnetic recording/reproduction device according to a second embodiment of the present invention.

A magnetic recording/reproduction device according to a second embodiment of the present invention is an improvement that avoids the problem. In the magnetic recording/reproduction device, a lubricant applicator 5 isn't directly contacting the magnetic tape 1, but it is in contact with a cylindrical rotating post 4 that slides over a magnetic tape 1 while rotating as schematically illustrated in FIG. 2. That is, lubricant in the lubricant applicator 5 of the lubricant supplier 10 is supplied to the magnetic tape 1 through the rotating post 4.

With this configuration, the rotating post 4 can contact with the magnetic tape 1 by a even pressure across the width of the magnetic tape 1 and therefore the lubricant can be constantly and appropriately supplied to the magnetic tape 1 through the rotating post 4 while the rotating post 4 is in contact with the magnetic tape evenly across the width of the magnetic tape 1. That is, lubricant is prevented from being unevenly supplied to the magnetic tape 1. Accordingly, a just enough amount of lubricant can be supplied to the magnetic tape 1 without supplying either too much or too little. Also, damage to the magnetic tape 1 can be prevented.

The lubricant applicator 5 in the second embodiment may be of cartridge type that is removable from a supporting member, not shown. While the magnetic head 2 in the embodiments illustrated in FIGS. 1 and 2 is a stationary head (so-called linear recording head), the present invention is not limited to this. The present invention is also applicable to a magnetic recording/reproduction device including a so-called helical-scan type rotating magnetic head 7.

(Third Embodiment)

FIGS. 3A to 6 schematically illustrate a configuration of a lubricant supplier and its neighboring section of a magnetic recording/reproduction device according to a third embodiment of the present invention.

The lubricant supplier 10 in FIGS. 3A to 6 is opposed to a rotating drum 11 including a magnetic head 2 for the magnetic recording/reproduction device. The rotating drum 11 is rotatably supported by a stationary drum 12 and rotates in the direction indicated by arrow C. A magnetic tape 1 is helically wrapped around the drums 11 and 12 at an angle. A rotating post 13*a* and a tilt post 13*b* guide the magnetic tape 1 to run the magnetic tape 1 in the direction indicated by arrow B. The drums 11 and 12 and the magnetic tape 1 are of helical-scan type, arranged so that its rotation brings the magnetic head 2 into contact with the magnetic tape 1 at an angle with respect to the travel direction of the magnetic tape 1. Typically, the axis of rotation of the drums 11 and 12 is tilted with respect to the magnetic tape 1 traveling in the horizontal direction and driven. For convenience, the drums 11 and 12 are depicted with the rotation axes upright in the figures.

Figure 3A:
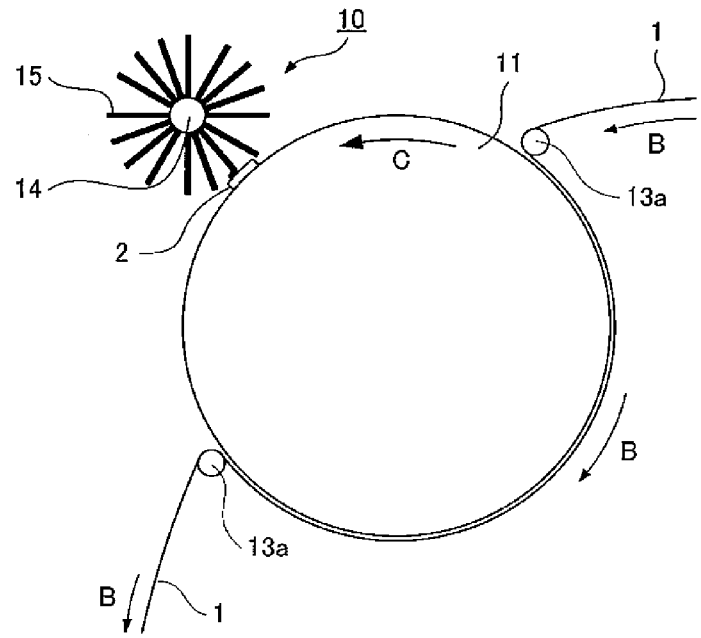
FIG. 3A is a plan view schematically illustrating a configuration of a lubricant supplier and its neighboring portion in a magnetic recording/reproduction device according to a third embodiment of the present invention.
Figure 3B:
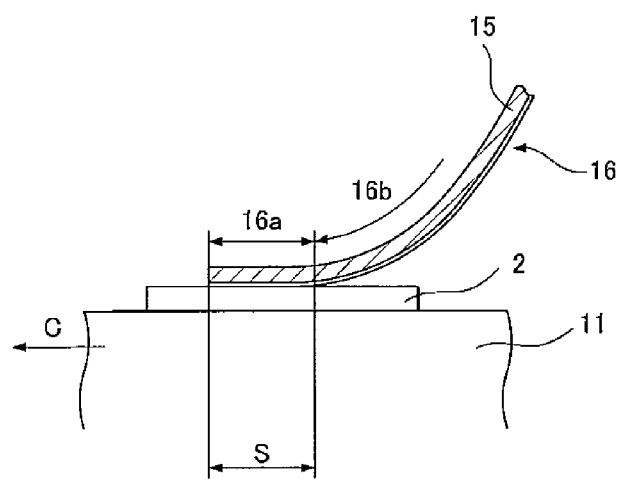
FIG. 3B is an enlarged horizontal-plane cross-sectional view schematically illustrating a configuration of the lubricant supplier in the magnetic recording/reproduction device.

The lubricant supplier 10 transfers some of lubricant contained in the lubricant supplier 10 to the magnetic head 2 to supply the lubricant to the magnetic tape 1 through the magnetic head 2. The lubricant supplier 10 in the third embodiment includes flexible films (sheets or thin-plates) 15 each having a lubricant coat formed on a surface, arranged around the rotary shaft 14. The films 15 come into contact with the magnetic head 2 one after another while turning. As illustrated in FIG. 3B, the lubricant coat 16 is formed on the surface that contacts with the magnetic head 2. The lubricant coat 16 includes a contact-surface lubricant coat 16*a* which contacts with the magnetic head 2 and a noncontact-surface lubricant coat 16*b* formed contiguously with the contact-surface lubricant coat 16*a*. Lubricant in the noncontact-surface lubricant coat 16*b* melts at a temperature higher than or equal to its melting point to move and is supplied to the contact-surface lubricant coat 16*a* according as the supply of the lubricant from the contact-surface lubricant coat 16*a* to the magnetic head 2 decreases. Here, the width S of the contact-surface lubricant coat 16*a* that contacts the magnetic head 2 may be only the edge of the lubricant coat 16 at the minimum. What is essential is that the contact-surface lubricant coat 16*a* formed contiguously with the noncontact-surface lubricant coat 16*b* of the lubricant coat 16 come into contact with the magnetic head 2 and lubricant be transferred to the magnetic head 2. Details of the lubricant coat 16, including the lubricant contained, will be described later.

Figure 4:
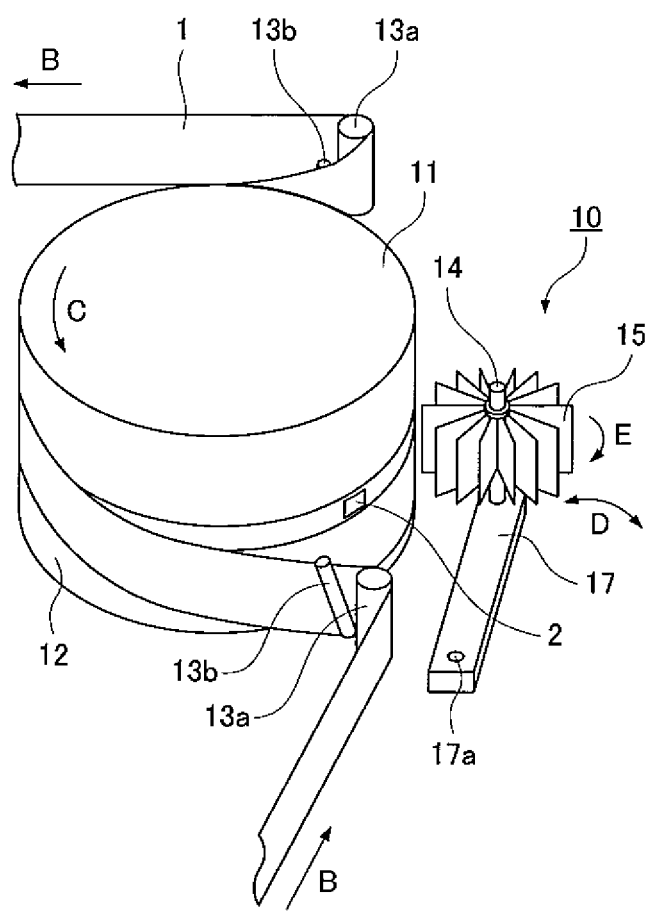
FIG. 4 is a perspective view schematically illustrating a configuration of the lubricant supplier and its neighboring section in the magnetic recording/reproduction device.

As illustrated in FIG. 4, the rotary shaft 14 of the lubricant supplier 10 stands on a supporting member 17 which is a swingable, as movable part. The supporting member 17 can swing on a pivot 17*a* in the directions indicated by arrow D to switch the lubricant supplier 10 between a supply position in which the edge of the film 15 contacts with the magnetic head 2 to supply the lubricant and a non-supply position in which the edge of the film 15 is separated from the magnetic head 2 to prevent the lubricant from being supplied to the magnetic head 2. In the position in which the edge of the film 15 is in contact with the magnetic head 2 to supply the lubricant, the edge of the film 15 contacts with the periphery of the rotating drum 11 and is rotated by the rotation force of the rotating drum 11 in the direction indicated by arrow E.

The films 15 of the lubricant supplier 10 may be rectangular films arranged around the rotary shaft 14 like a windmill. The edge portion of the film 15 that faces the magnetic head 2 and that locates closest to the magnetic head 2 bends and comes into contact with the magnetic head 2. As has been described, the lubricant coat 16 is formed on the surface that contacts with the magnetic head 2. The films 15 are rotatable and come into contact with the magnetic head 2 one after another. The films 15 are flexible so that the films 15 snap back once they go out of contact with the magnetic head 2.

Figure 5:
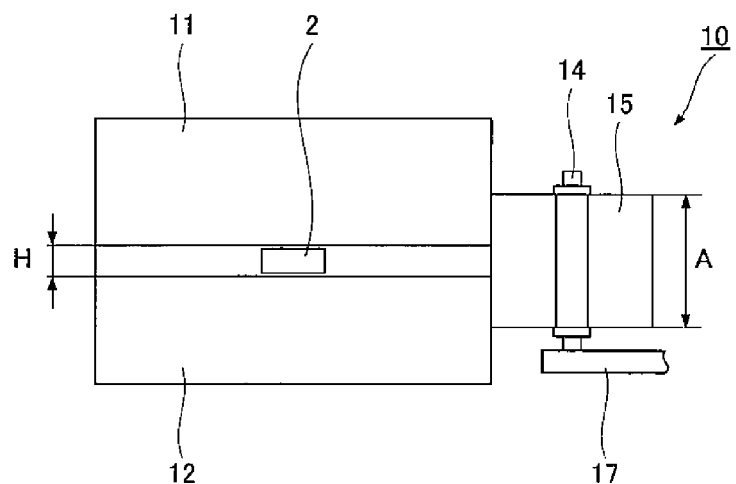
FIG. 5 is a side view schematically illustrating a configuration of the lubricant supplier and its neighboring section in the magnetic recording/reproduction device.
Figure 6:
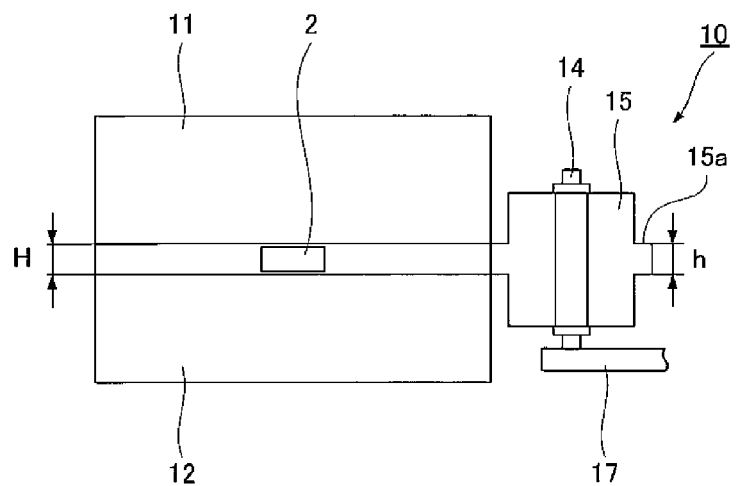
FIG. 6 is a side view schematically illustrating a configuration of alternative lubricant supplier and its neighboring section in the magnetic recording/reproduction device.

Each of the films 15 is configured as illustrated in FIG. 5 or 6. In FIG. 5, the full width of the film 15 along its axis contacts with the peripheries of rotating drum 11 and the stationary drum 12 including the magnetic head 2, with the portion of the film 15 that faces the magnetic head 2 being roughly in the center, so that the rotation force of the rotating drum 11 rotates the film 15 in the direction indicated by arrow E. In FIG. 6, a projection 15a is formed in the position at the edge of the film 15 that faces the magnetic head 2. The projection 15a is the contact-surface lubricant coat 16a that is the only portion that contacts with the magnetic head 2. This arrangement prevents lubricant from being transferred to the peripheries of the rotating drum 11 and the stationary drum 12 other than the magnetic head 2 portion. Here, the width "h" of the projection 15a is $h \leq H$, where "H" is the width of the magnetic head 2 portion. In the example in FIG. 6, if the lubricant coat 16 is formed over the entire surface excluding the projection 15a, the wide region of the lubricant coat 16 that does not contact with the magnetic head 2 can be the noncontact-surface lubricant coat 16b.

The width of the entire film 15 is wider than the width H of the magnetic head 2 portion and the width h of the projection 15a in FIG. 6 is such that $h \leq H$ in the foregoing. However, the full width "A" of the film 15 may be smaller than or equal to the width H of the magnetic head 2 portion ($A \leq H$) so that no lubricant is transferred to the peripheries of the rotating drum 11 and stationary drum 12 other than the magnetic head 2 portion.

As has been described, the surface of the films 15 is needed to be such that the lubricant coat 16 can be formed on it. The films 15 may be made of a material such as a polymer resin or a metal thin film. The polymer resin may be a material such as polyethylene, polyethylene terephthalate, nylon, silicon resin, or cellulose. The polymer resin preferably does not generate contaminants such as an out gas in an operating ambience of the magnetic recording/reproduction device. The film that does not generate contaminants such as an out gas in the operating ambience of the magnetic recording/reproduction device may be made of a material such as a metal or semiconductor, a single substance or a mixture, that can be formed in the form of a film. In order to eliminate chippings and burrs caused by processing, a finish may be applied to the surfaces and edges of the films 15. In order to prevent erosion, the surfaces of the films 15 may be coated with an erosion-resistant inorganic, organic, metal material or a combination of these by plating, sputtering, or coating.

To transfer lubricant contained in the lubricant coat 16 to the magnetic head 2, an appropriate contact pressure is required. To improve the contact pressure required, contact of the end surface including the edge of the film 15 with the magnetic head 2 is more effective and lubricant is more effectively transferred to the magnetic head 2 than surface contact of the lubricant coat 16 formed on the film 15 with the magnetic head 2.

The thickness of the film 15 is not particularly specified. It is only essential that the flexibility of the film 15 is adjusted so that the film 15 comes into contact with the entire surface of the magnetic tape 1 sliding portion at the magnetic head 2 and can transfer lubricant to the entire surface. Very thin flexible films may be stacked together to adjust the flexibility so that a sufficient contact pressure can be applied to the magnetic head 2.

With this configuration, a proper amount of lubricant can be supplied to the surface of the magnetic head 2. By using the magnetic head 2 as a part of the lubricant supplier 10, that is, by using the magnetic head 2 in place of the rotating post 4 of the second embodiment, a simpler configuration can be achieved than the configuration that includes the rotating post 4 dedicated to supplying lubricant. In this configuration, as in the configurations described previously, the lubricant supplier 10 can supply lubricant to the magnetic tape 1 during recording/reproduction. Therefore, lubricant can be appropriately supplied to the magnetic tape 1 used in a magnetic recording/reproduction device that needs to keep continuously operating.

Lubricant that forms the lubricant coat 16 described previously will be described below. The lubricant used for the lubricant coat 16 is needed to be such that the lubricant coat 16 can be formed on the surface of the film 15 and an excessive amount of lubricant is not held and supplied to the magnetic head 2, and the lubricant does not become lumpy in the environment in which the magnetic recording/reproduction device is used.

Lubricant that is not excessively flowable in the ambience in which the lubricant supplier 10 is installed can be used for forming the lubricant coat 16. Specifically, the melting point of the lubricant is preferably higher than or equal to 23° C., more preferably higher than or equal to 28° C., in order to prevent unsteady movement of the magnetic tape 1 due to an excessive flow of lubricant to the magnetic tape 1 sliding portion other than the magnetic head 2, assuming that the temperature in the ambience in which the lubricant supplier 10 is installed is 28° C., which is equal to the temperature of typical ambience in which the magnetic recording/reproduction device is used (assumed to be 23° C.) plus a temperature rise (5° C.) of the lubricant supplier 10 due to heat generation by operation of the magnetic recording/reproduction device.

Here, the melting point of lubricant represents the temperature at which the lubricant becomes flowable in the environment in which the magnetic recording/reproduction device including the lubricant supplier 10 of the present invention is used. At temperatures higher than or equal to the melting point, the flowability of the lubricant is high. Unsteady movement of the magnetic tape 1 due to an excessive supply of lubricant to a magnetic tape 1 sliding portion other than the magnetic head 2 does not occur if a lubricant that does not exhibit an excessive flowability at its melting point or higher is used or a lubricant that does not exhibit an excessive flowability at its melting point or higher is mixed in the film, or if the flowability of a lubricant at its melting point or higher is stably controlled with an additive, which will be described later, or a film to which treatment, which will be described later, is applied to prevent lubricant from exhibiting an excessive flowability at its melting point or higher is used, or the form illustrated in FIG. 6 is used to supply lubricant concentratedly to the magnetic tape 1 through the magnetic head 2.

Humidity ambience in which the lubricant supplier 10 is installed is the humidity ambience in which the magnetic recording/reproduction device is used, which is chosen by taking into account the heat generated by the operation of the magnetic recording/reproduction device. A lubricant that hardly exhibits segregation of hydrates or other substance at such high humidity can be used. The pressure ambience in which the lubricant supplier 10 is installed is the ambience in which the magnetic recording/reproduction device is used. A lubricant that hardly evaporates in such pressure ambience can be used.

Examples of lubricants that meet the conditions given above include a lubricant containing at least one chemical compound selected from fluorine-containing monocarbonic acids that contain a perfluoroalkyl group or a perfluoropolyether group, and an alkyl group or an alkenyl group in a molecule, and a lubricant containing at least one chemical compound selected from perfluoropolyether compounds in which a polar group is combined at either end, and a lubricant that contains at least one fatty acid selected from the group consisting of a stearic acid derivative, fatty acid amide derivative, palmitic acid derivative, myristic acid derivative and oleic acid derivative. Aliphatic metal salt containing at least one metal selected from the group consisting of zinc, aluminum, calcium, magnesium, iron and lithium may be used as or contained in the lubricant, or graphite fluoride, graphite, or molybdenum sulfide may be used.

The lubricant described can use the rolling resistance of spherical molecules to maintain lubricity in a high temperature environment. Such a lubricant may be a solid-state lubricant coat which is coated with a fullerene consisting of spherical carbon clusters. The lubricant may be a mixture of molecules of at least one type selected from fullerenes and their derivatives, and at least one type of fluorine lubricant, preferably the perfluoropolyether compound given above. Alternatively, the lubricant may be at least one type of fluorine lubricant to which a fullerene derivative is added as required.

Examples of the additive that can be added to lubricant for ensuring stable flowability of the lubricant in both high and low temperature environments include: an anion surfactant (such as a naphthalenesulfonate formalin condensation product or polystyrene sulfonate salt), a nonionic surfactant (such as polyoxyethylene alkyl ether or nonyl phenol), a cation surfactant (such as amine series), and a dispersant (such as a polycarboxylate, polyacrylic ester salt, phthalocyanine, or azo compound).

The thickness of lubricant that forms the lubricant coat 16 will be described below. Lubricant that can be formed as a thin film on the surface of the film 15 of the present invention may have any thickness that does not cause the film 15, which is a small cut piece, to stick to an adjacent film 15 to bend locally at an unintended portion other than the lubricant supplying portion of the contact-surface lubricant coat 16a or does not cause the contact-surface lubricant coat 16a portion to be entangled with an adjacent film 15 to damage the shape and feature of the film 15. The film 15 can stick to an adjacent film 15 because of the surface tension or intermolecular force acting between the smooth surfaces of the films 15, or the surface tension or intermolecular force acting in lubricant that fills the gap between the films 15 if the gap is filled with lubricant. The former cause, "the surface tension or intermolecular force acting between the smooth surfaces", can be reduced by increasing the surface roughness of the films 15; the latter cause, "the surface tension or intermolecular force acting in lubricant", can be reduced by increasing the distance between the films 15. However, to eliminate the need for adjustment of the surface roughness of the films 15 and the distance between the films 15, the thickness of the lubricant coat 16 of the present invention is preferably less than or equal to 0.05 μm, more preferably less than or equal to 0.01 μm, if the surface roughness of the film 15 used is 0.05 μm. Experiments have shown that adjacent films 15 did not stick to each other when the thickness of the lubricant coat is in the range of 0.01 to 0.05 μm.

A method for forming the lubricant coat 16 on the film 15 will be described below. The method for forming the lubricant coat 16 is not limited to a specific method or process; any of coating, vapor deposition, dipping, or transfer or the like may be used. If a satisfactory lubricant cannot be provided in the ambiences described previously, lubricants having different physical properties may be stacked on top of another or mixed together, or may be partially formed into a film in order to enable lubricant supply in any ambience. In particular, in order to provide a lubricant that exhibits a stable flowability in any of high and low temperature environments and an environment where temperature repeatedly swings between high and low temperatures, the processing of the films 15 may be any of UV irradiation, plasma irradiation, UV anchoring and anchoring using perhydropolysilazane, in order to add functional groups having a strong force of binding with the lubricant to the surface of the films 15 to prevent low-melting-point lubricant from excessively flowing or becoming lumpy due to cohesion.

(Fourth Embodiment)

The lubricant supplier 10 in the third embodiment described previously has a configuration in which multiple flexible films (sheets) 7 on which a lubricant coat 16 is formed are arranged around the rotary shaft 14 so that the multiple films 15 can come into contact with the magnetic head 2 one after another while rotating. Another configuration has been described in which a projection 15a is formed to allow lubricant to be supplied only to the magnetic head portion 2. Various other film sheets that can offer the same effects can be contemplated such as configurations illustrated in FIG. 7A to 9B. The film lubricant suppliers 10 will be described with reference to FIGS. 7A to 9B.

Figure 7A:
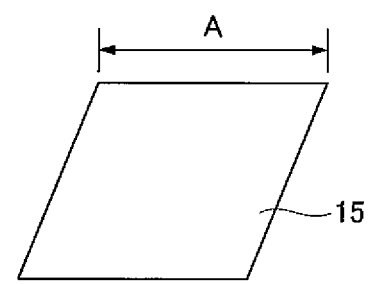
FIG. 7A is a diagram illustrating an exemplary form of a lubricant supplier formed by a film in the magnetic recording/reproduction device according to a fourth embodiment.

The one illustrated in FIG. 7A is a single rectangular film in the third embodiment described. The film may be attached to a rotary shaft 14 as in the third embodiment, or may be used by itself without a rotary shaft 14 or multiple such rectangular films 15 may be attached together without a rotary shaft 14. Any of these configurations are easy to fabricate. However, the total area of the lubricant coat 16, including a noncontact-surface lubricant coat 16b, is limited. The lubricant coat 16 in the example illustrated in FIG. 7A is formed in a manner similar to that in the third embodiment, including details such as lubricant. The projection 15a described previously may be formed as a contact-surface lubricant coat 16a part and only the projection 15a may be brought into contact with the magnetic head 2. By choosing the full width A of the film 15 to be smaller than or equal to the width H of the magnetic head 2 ($A \leq H$), transfer of lubricant to the peripheries of the rotating drum 11 and stationary drum 12 other than the magnetic head 2 can be prevented.

Figure 7B:
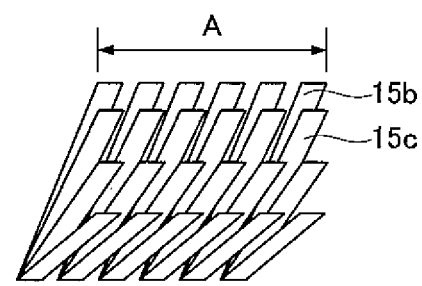
FIG. 7B is a diagram illustrating an exemplary form of a lubricant supplier formed by a film in the magnetic recording/reproduction device according to the fourth embodiment.

The lubricant supplier illustrated in FIG. 7B is the same as that in the third embodiment in that the lubricant supplier consists of multiple films 15. In this example, however, the full width A of each film 15 is separated into multiple narrow films 15c by slits 15b. If the full width A is chosen to be such that $A \leq H$, the example provides the effect of preventing transfer of lubricant to the peripheries of the rotating drum 11 and the stationary drum 12 other than the magnetic head 2 described previously. In addition, if the surface of the magnetic head 2 is uneven, each of the narrow films 15c advantageously flexes according to the unevenness to supply lubricant from the lubricant coat 16 formed on each of the narrow film 15c to the surface of the magnetic head 2. The lubricant coat 16 in this example is formed in a manner similar to that in the third embodiment, including details such as lubricant. The number of films 15 attached to the rotary shaft 14 and the provision of a swingable supporting member 17 on which the rotary shaft 14 rests are the same as those in the third embodiment.

Figure 8A:
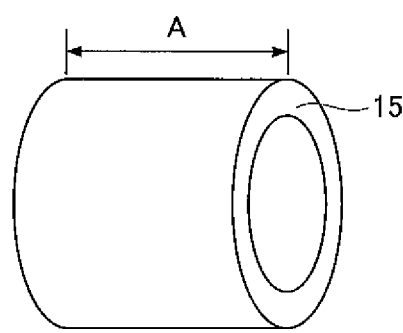
FIG. 8A is a diagram illustrating an exemplary form of a lubricant supplier formed by a film in the magnetic recording/reproduction device according to the fourth embodiment.
Figure 8B:
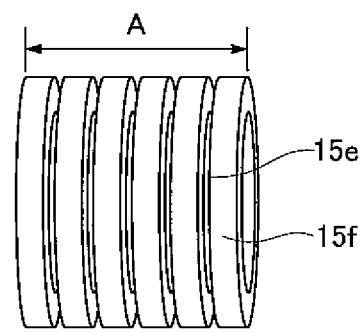
FIG. 8B is a diagram illustrating an exemplary form of a lubricant supplier formed by a film in the magnetic recording/reproduction device according to the fourth embodiment.

The lubricant suppliers illustrated in FIGS. 8A and 8B are the same as the one in the third embodiment in that they consist of films 15. However, the films 15 in these examples are not rectangular but cylindrical. Specifically, the lubricant supplier illustrated in FIG. 8A is formed as a single cylindrical film 15d over the full width A and a lubricant coat 16 is formed on the surface of the film 15d. In the lubricant supplier illustrated in FIG. 8B, a single film 15 is separated into narrow cylindrical films 15f by slits 15e and a lubricant coat 16 is formed on the surface of each narrow cylindrical film 15f. In this example, the peripheries of the cylindrical films 15d and 15f are brought into contact with the magnetic head 2 and the peripherals of the drums 11 and 12 and lubricant is supplied from the lubricant coats 16 formed on the surface of the films 15. If the full width A is chosen to be such that $A \leqq H$, the example provides the effect of preventing transfer of the lubricant to the peripheries of the rotating drum 11 and the stationary drum 12 other than the magnetic head 2 portion. In addition, in the lubricant supplier illustrated in FIG. 8B, each of the narrow cylindrical films 15f flexes according to unevenness of the surface of the magnetic head 2 if the surface of the magnetic head 2 is uneven, thereby supplying lubricant from the lubricant coat 16 formed on the surface of each narrow cylindrical film 15f to the surface of the magnetic head 2. The lubricant coat 16 in this example is formed in a manner similar to that in the third embodiment, including details such as lubricant.

Figure 9A:
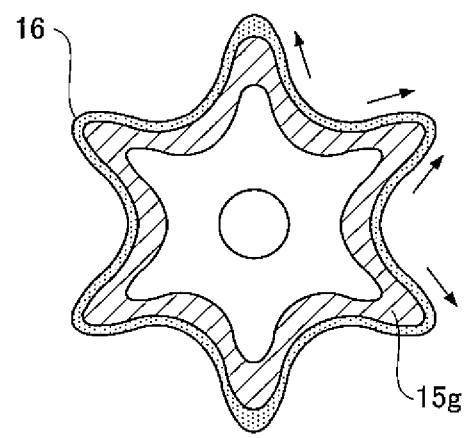
FIG. 9A is a diagram illustrating an exemplary form of a lubricant supplier formed by a film in the magnetic recording/reproduction device according to the fourth embodiment.

In the lubricant supplier illustrated in FIG. 9A, a film 15 is formed as a tubular film 15g having projections and depressions and a lubricant coat 16 is formed on the surface of the film 15g. The projections are arranged so that they come into contact with the magnetic head 2. The lubricant coat 16 on the tip of each of the projections which contacts with the magnetic head 2 acts as a contact-surface lubricant coat 16a and the portions that do not contact with the magnetic head 2 acts as noncontact-surface lubricant coats 16b. The multiple projections are allowed to come into contact with the magnetic head 2 one after another to supply lubricant from the lubricant coat 16 to the magnetic head 2. The arrows in FIG. 9A indicate the directions in which lubricant contained in the noncontact-surface lubricant coat 16b formed on the surface of the depressions move toward the tips of the projections where the amount of lubricant has decreased because some of lubricant has been supplied to the magnetic head 2 when the tips has come into contact with the magnetic head 2. The full width A of the film in this example, a cross-section of which is illustrated, may be greater than the width H of the magnetic head 2 portion or may be smaller than or equal to the width H of the magnetic head 2 portion ($A \leqq H$) as in the embodiments described previously. If the full width A is chosen to be such that $A \leqq H$, the example has the effect of preventing transfer of the lubricant to the peripheries of the rotating drum 11 and the stationary drum 12 other than the magnetic head 2 described previously. The lubricant coat 16 in this example is formed in a manner similar to that in the third embodiment, including details such as lubricant.

Figure 9B:
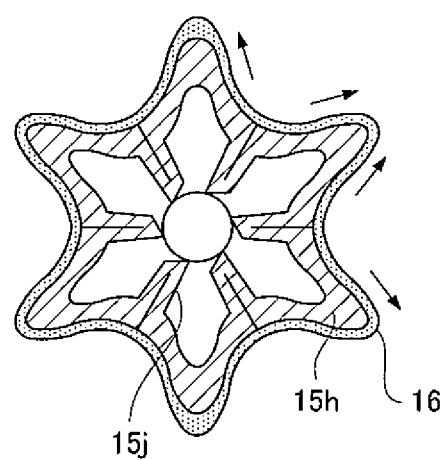
FIG. 9B is a diagram illustrating an exemplary form of a lubricant supplier formed by a film in the magnetic recording/reproduction device according to the fourth embodiment.

The lubricant supplier illustrated in FIG. 9B is a variation of the one illustrated in FIG. 9A. The lubricant supplier is formed as a tubular film 15h that can protect itself from undesirable film deformations. The example differs from the one illustrated in FIG. 9A in that the former has protective portions 15j formed by bending the film inward. The configuration has the same effects as those of the configuration illustrated in FIG. 9A except for the protection from undesirable film deformations.

(Fifth Embodiment)

A lubricant supplier 10 according to a fifth embodiment is formed as a block (a solid object) instead of the film(s) (sheet (s)) described previously. Various shapes as illustrated in FIGS. 10A to 12, for example, can be conceived.

In the lubricant supplier 10 formed as a block (solid object), a contact-surface lubricant coat is formed on a surface that contacts with a magnetic head and a noncontact-surface lubricant coat is formed contiguously with the contact-surface lubricant coat as in the lubricant supplier 10 formed as films (sheets). The noncontact-surface lubricant coat is formed so that lubricant in the noncontact-surface lubricant coat melts at its melting point or a higher and moves and is supplied to the contact-surface lubricant coat as the amount of lubricant in the contact-surface lubricant coat decreases by the supply to the magnetic head. The block (solid object) has at least one projection on which a lubricant coat is formed. The projection faces the magnetic head and contacts with the magnetic head to allow the projection to act as the contact-surface lubricant coat. Lubricant that forms the lubricant coat is the same as that of the films (sheets) described previously. The lubricant supplier 10 formed as a block (a solid object) will be described with reference to FIGS. 10A to 12.

Figure 10A:
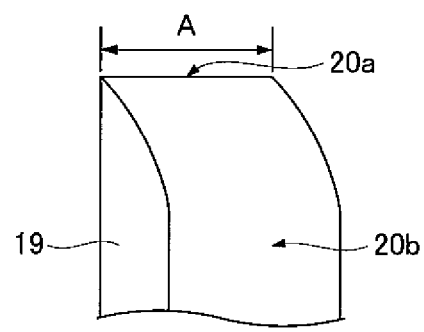
FIG. 10A is a diagram illustrating an exemplary form of a lubricant supplier formed by multiple blocks in the magnetic recording/reproduction device according to a fifth embodiment.

In FIG. 10A, the block 19 has a contact portion 20a at an edge that contacts with the magnetic head 2. The block 19 also has a noncontact portion 20b formed contiguously with the contact portion 20a at the edge. A lubricant coat 16 is formed on the contact portion 20a and the noncontact portion 20b (the lubricant coat itself is the same as those in the embodiments described previously and therefore is given the same reference numeral). The lubricant coat 16 on the contact portion 20a is formed as a contact-surface lubricant coat 16a and the lubricant coat 16 on the noncontact portion 20b is formed as a noncontact-surface lubricant coat 16b. With this configuration, lubricant in the contact portion 20a is supplied to the magnetic head 2 and the lubricant in the noncontact portion 20b melts and moves to the contact portion 20a as the lubricant in the contact portion 20a decreases. Here, by choosing the full width A of the block 19 and the width H of the magnetic head 2 portion to be such that $A \leqq H$, transfer of lubricant to the peripheries of the rotating drum 11 and a stationary drum 12 other than the magnetic head 2 can be prevented.

Figure 10B:
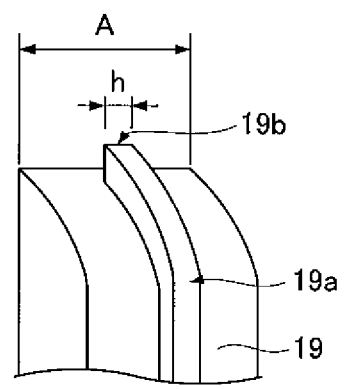
FIG. 10B is a diagram illustrating an exemplary form of a lubricant supplier formed by multiple blocks in the magnetic recording/reproduction device according to the fifth embodiment.

In the lubricant supplier illustrated in FIG. 10B, a projection 19a having a width "h" smaller than the full width A of the block 19 is formed so that an edge 19b of the projection 19a contacts with the magnetic head 2. Here, the width "h" of the projection 19a is smaller than or equal to H ($h \leqq H$) to prevent lubricant from being transferred to the peripheries of the rotating drum 11 and the stationary drum 12 other than the magnetic head 2. The block 19 does not contact with the drums 11 and 12 even if the full width A of the block 19 is chosen to be greater than the width "H" of the magnetic head 2. A lubricant coat formed on the edge 19b of the projection 19a that contacts with the magnetic head 2 is a contact-surface lubricant coat 16a. The lubricant coat 16 is formed contiguously on the other portions, that is, the other portion of the projection 19a and the surface of the block 19 that is not projected, to provide a noncontact-surface lubricant coat 16b. In this case, a large surface area of the noncontact-surface lubricant coat 16b can be provided as compared with the case in FIG. 10A where A≦H.

Figure 11A:
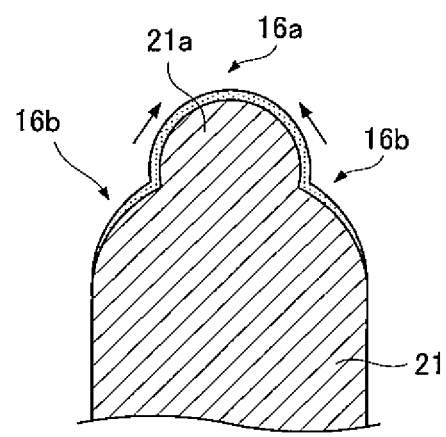
FIG. 11A is a diagram illustrating an exemplary form of a lubricant supplier formed by multiple blocks in the magnetic recording/reproduction device according to the fifth embodiment.

FIG. 11A illustrates a cross-section of a block 21, which is a variation of the block 19 described previously and is different from the block 19 in shape. The arrows in FIG. 11A indicate the directions, in a lubricant coat 16 formed on the surface of the block 21, in which melted lubricant is supplied from a noncontact-surface lubricant coat 16b to a contact-surface lubricant coat 16a on a top portion 21a that contacts with the magnetic head 2. Lubricant moves more smoothly than in the configurations illustrated in FIGS. 10A and 10B in which lubricant is supplied from only one side. In the example illustrated in the cross-sectional view, the full width A may be greater than the width H of the magnetic head 2 as in the example described previously or smaller than or equal to H, (A≦H). If the full width A is smaller than or equal to H, lubricant is prevented from being transferred to the peripheries of the rotating drum 11 and the stationary drum 12 other than the magnetic head 2.

Figure 11B:
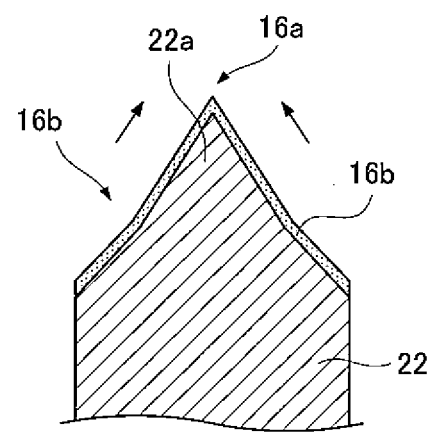
FIG. 11B is a diagram illustrating an exemplary form of a lubricant supplier formed by multiple blocks in the magnetic recording/reproduction device according to the fifth embodiment.

The block 22 illustrated in FIG. 11B is a variation of the one illustrated in FIG. 11A. A cross-section of the edge of the block 22 has the shape of an acute angle. As in the example in FIG. 11A, the directions are illustrated in which melted lubricant is supplied from a noncontact-surface lubricant coat 16b in a lubricant coat 16 formed on the surface of the block 22 to a contact-surface lubricant coat 16a on a top portion 22a that contacts with the magnetic head 2. The effect is the same as that of the one illustrated in FIG. 11A.

Figure 12:
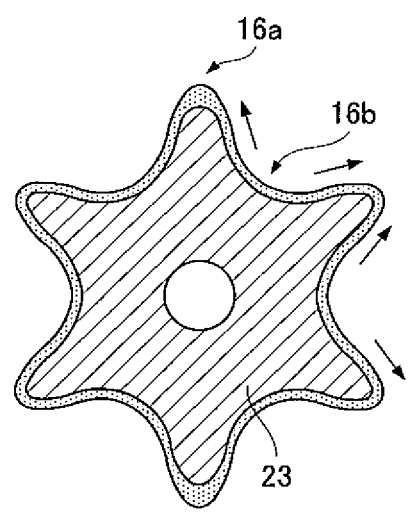
FIG. 12 is a diagram illustrating an exemplary form of a lubricant supplier formed by multiple blocks in the magnetic recording/reproduction device according to the fifth embodiment.

FIG. 12 illustrates a lubricant supplier formed by a block 23 having projections and depressions in its periphery as in the examples of films described previously and illustrated in FIGS. 9A and 9B. A lubricant coat 16 is formed on the surface of the block 23. The projections are arranged so as to come into contact with the magnetic head 2. The lubricant coat 16 on the tip of each of the projections which contacts with the magnetic head 2 acts as a contact-surface lubricant coat 16a, and the portion that does not contact with the magnetic head 2 act as a noncontact-surface lubricant coat 16b. The multiple projections are allowed to come into contact with the magnetic head 2 one after another to supply lubricant from the lubricant coat 16 to the magnetic head 2. The arrows in FIG. 12 indicate the directions in which lubricant contained in the noncontact-surface lubricant coats 16b formed on the depressions moves toward the tips of the projections where the amount of the lubricant has decreased because some of the lubricant has been supplied to the magnetic head 2 when the tips has come into contact with the magnetic head 2. The full width A of the lubricant supplier, a cross-section of which is illustrated in this example, may be greater than or equal to the width H of the magnetic head 2, A≦H, as in the examples described previously. If the full width A is chosen to be such that A≦H, the example has the effect of preventing transfer of lubricant to the peripheries of the rotating drum 11 and the stationary drum 12 other than the magnetic head 2.

The lubricant supplier 10 using any of the blocks described in the fifth embodiment can apply a sufficient contact pressure to the magnetic head 2 compared with the lubricant supplier 10 that uses any of films described previously. In the lubricant supplier 10 using the block, a contact-surface lubricant coat 16a is formed on a surface that contacts with the magnetic head 2 and a noncontact-surface lubricant coat 16b is formed contiguously with the contact-surface lubricant coat 16a, as in the films. The noncontact-surface lubricant coat 16b is formed in such a manner that lubricant in the noncontact-surface lubricant coat 16b melts at its melting point or higher and moves and is supplied to the contact-surface lubricant coat 16a as the amount of lubricant in the contact-surface lubricant coat 16a decreases by the supply to the magnetic head 2, thereby achieving the desired effect. In addition, since the contact-surface lubricant coat 16a is formed on the surface of a portion of the block that contacts with the magnetic head 2 and the noncontact-surface lubricant coat 16b is formed on the surface of the block contiguously with the contact-surface lubricant coat 16a, an excessive amount of lubricant is not held. Therefore an excessive amount of lubricant is not supplied and the lubricant does not become lumpy in an environment where the magnetic recording/reproduction device is placed.

(Sixth Embodiment)

A lubricant supplier 10 of a sixth embodiment is formed as a block (a solid object) as in the fifth embodiment. In the sixth embodiment, the lubricant supplier 10 includes multiple blocks. For example, blocks having the shapes illustrated in FIGS. 13A and 13B may be contemplated.

This embodiment provides a lubricant supplier which can readily supplying lubricants having different melting points to a magnetic head according to different ambient temperatures because lubricant coats formed on the different blocks making up the lubricant supplier are made of lubricants having different melting points.

The lubricant supplier 10 formed by multiple blocks will be described with reference to FIGS. 13A and 13B.

Figure 13A:
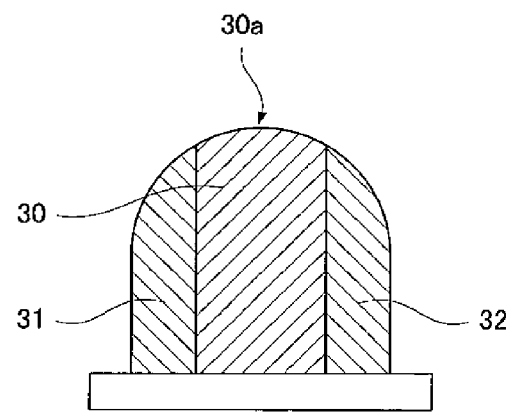
FIG. 13A is a diagram illustrating an exemplary form of a lubricant supplier formed by multiple blocks in the magnetic recording/reproduction device according to a sixth embodiment.

FIG. 13A illustrates a lubricant supplier 10 including blocks 30, 31 and 32, on each of which a lubricant coat is formed. The blocks 30, 31 and 32 are combined together and the topmost portion 30a of the middle block 30 is enabled to contact a magnetic head 2. The lubricant coat formed on the topmost portion 30a is a contact-surface lubricant coat and the lubricant coats formed on the other portions and blocks 31 and 32 are noncontact-surface lubricant coats. The combination of blocks as a whole has a cross-sectional shape of a single projection. In this example, lubricant in the lubricant coat on the topmost portion 30a of the block 30 is transferred to a magnetic tape 1 through the magnetic head 2 and decreases. As the lubricant decreases, an amount of lubricant in the noncontact-surface lubricant coat on the other portions of the block 30 melts and is supplied to the topmost portion 30a and lubricant in the lubricant coats formed on the other blocks 31 and 32 (these lubricant coats are noncontact-surface lubricant coats) also melts and is supplied. Accordingly, when lubricant coats of lubricants having different melting points are formed on the blocks, the lubricant coat of the lubricant that has the lowest melting point is formed on the block 30 that includes the portion that contacts with the magnetic head 2 and lubricant coats of lubricants that have higher melting points are formed on the other blocks 31 and 32 to allow smooth supply of lubricant to the magnetic head 2. By forming lubricant coats also in contact regions between the blocks 30, 31 and 32, the total area of the entire noncontact-surface lubricant coats can be increased. Each of the contact regions is formed in such a manner that a gap where the lubricant coat can be formed is provided.

Figure 13B:
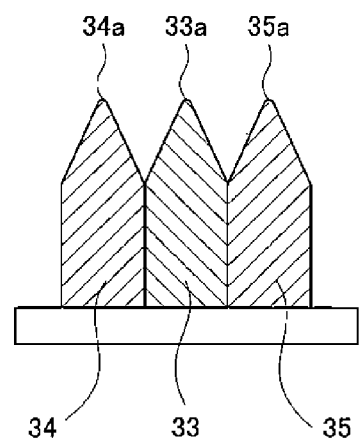
FIG. 13B is a diagram illustrating an exemplary form of a lubricant supplier formed by multiple blocks in the magnetic recording/reproduction device according to the sixth embodiment.
Figure 14A:
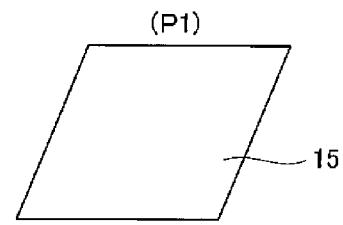
FIG. 14A is a diagram illustrating a form of a lubricant supplier used as an exemplary embodiment of a lubricant supplier of the magnetic recording/reproduction device.
Figure 14B:
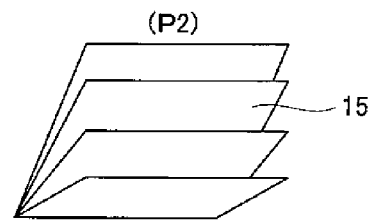
FIG. 14B is a diagram illustrating a form of a lubricant supplier used as an exemplary embodiment of a lubricant supplier of the magnetic recording/reproduction device.
Figure 14C:
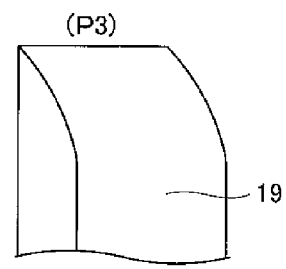
FIG. 14C is a diagram illustrating a form of a lubricant supplier used as an exemplary embodiment of a lubricant supplier of the magnetic recording/reproduction device.
Figure 14D:
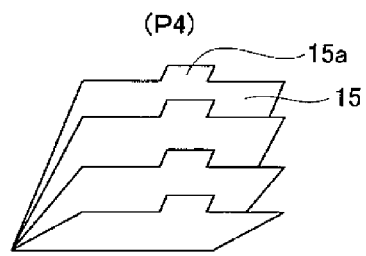
FIG. 14D is a diagram illustrating a form of a lubricant supplier used as an exemplary embodiment of a lubricant supplier of the magnetic recording/reproduction device.
Figure 15A:
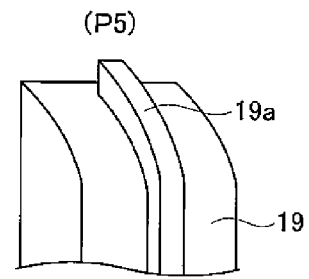
FIG. 15A is a diagram illustrating a form of a lubricant supplier used as an exemplary embodiment of a lubricant supplier of the magnetic recording/reproduction device.
Figure 15B:
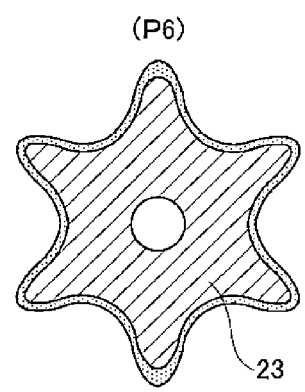
FIG. 15B is a diagram illustrating a form of a lubricant supplier used as an exemplary embodiment of a lubricant supplier of the magnetic recording/reproduction device.
Figure 15C:
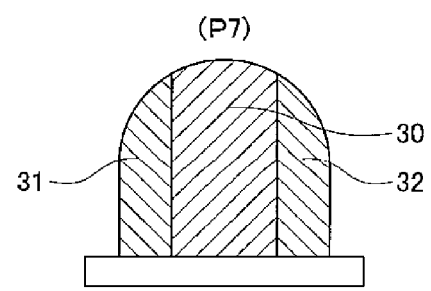
FIG. 15C is a diagram illustrating a form of a lubricant supplier used as an exemplary embodiment of a lubricant supplier of the magnetic recording/reproduction device.

FIG. 13B illustrates a lubricant supplier including blocks 33, 34 and 35, on each of which a lubricant coat is formed. Each of the blocks 33, 34 and 35 is formed to have a cross-sectional shape having a projection. The topmost portion 33a, 34a, 35a of each block can contact with the magnetic head 2, the lubricant coat formed on the topmost portion is a contact-surface lubricant coat, and the lubricant coats formed on the other portions are noncontact-surface lubricant coats. If the lubricant coats on the blocks 33, 34 and 35 in this example are made of lubricants that have different melting points, lubricant in the lubricant coat on any of the blocks 33, 34 and 35 melts and is transferred to the magnetic head 2 depending on the ambient temperature, because adjacent blocks 33, 34 and 35 are in contact with each other.

(Exemplary Embodiments)

First to seventh exemplary embodiments of methods for fabricating the magnetic tape according to the third to sixth embodiments described previously will be described below, in which different magnetic tape substrate materials, configurations, and fabrication conditions were used. First to third comparative examples according to conventional art will also be described. Results of characteristic evaluations of magnetic tapes fabricated according to the exemplary embodiments will be compared with those of magnetic tapes fabricated according to comparative examples to verify the effects of the present invention. The first to seventh exemplary embodiments are of the various exemplary configurations of the lubricant suppliers 10 according to the third to sixth embodiments described previously. In particular, the first to seventh exemplary embodiments to be verified are based on the seven exemplary configurations (p1) to (P7) illustrated in FIGS. 14A to 14D and 15A to 15C. Films 15 that contact with the periphery of the rotating drum 11 are free to rotate.

(First Exemplary Embodiment)

Lubricant used in the first exemplary embodiment was a fluoride having a melting point of 55° C., which was higher than the ambient temperature (28° C.) of a magnetic recording/reproduction device during use heated by heat generated by the magnetic recording/reproduction device itself operating at room temperature (23° C.). The lubricant was applied to a surface and an edge face of a polyethylene terephthalic acid film or an extruded polypropylene block with a thickness of approximately 6 μm to form a lubricant coat to a thickness of approximately 0.01 μm. The magnetic tape had an obliquely evaporated cobalt or cobalt oxide magnetic layer. The magnetic layer was 0.5 inches wide and approximately 9 μm thick in total.

(Second Exemplary Embodiment)

In the second exemplary embodiment, a lubricant having a melting point of 28° C. was used for the lubricant coat. The rest of the second exemplary embodiment was the same as the first exemplary embodiment, including that the lubricant is a mixed lubricant.

(Third Exemplary Embodiment)

In the third exemplary embodiment, a fluoride lubricant having a melting point of 55° C. and another fluoride lubricant having a melting point of 20° C., which was lower than room temperature (23° C.), were mixed and used for the lubricant coat. The rest of the third exemplary embodiment was the same as the first exemplary embodiment.

(Fourth Exemplary Embodiment)

In the fourth embodiment, a lubricant coat was formed to a thickness of 0.05 μm. The rest of the fourth exemplary embodiment was the same as the first exemplary embodiment.

(Fifth Exemplary Embodiment)

In the fifth exemplary embodiment, a lubricant having a melting point lower than 28° C. (in particular, 25° C.) was used. The rest of the fifth exemplary embodiment was the same as the first exemplary embodiment.

(Sixth Exemplary Embodiment)

In the sixth exemplary embodiment, two types of lubricants both having a melting point lower than 28° C. (in particular, one has a melting point of 25° C. and the other 20° C.) were used. The rest of the sixth exemplary embodiment was the same as the first exemplary embodiment.

(Seventh Exemplary Embodiment)

In the seventh exemplary embodiment, a lubricant coat was formed to a thickness of 0.06 μm. The reset of the seventh exemplary embodiment was the same as the first exemplary embodiment.

(First Comparative Example)

In the first comparative example, a magnetic recording/reproduction device without a lubricant supplier, among the various examples of the conventional art described earlier, was used. Only a lubricant applied to the magnetic tape was supplied. The lubricant was the same fluoride used in the first exemplary embodiment having a melting point of 55° C.

(Second Comparative Example)

In the second comparative example, the lubricant applied to the magnetic tape was the same fluoride used in the second exemplary embodiment having a melting point of 28° C. However, a magnetic recording/reproduction device without a lubricant supplier was used, as in the first comparative example.

(Third Comparative Example)

In the third comparative example, a magnetic tape on which two types of lubricants were applied was used. The lubricants were the same as those used in the third exemplary embodiment: a fluoride having a melting point of 55° C. and a fluoride having a melting point of 20° C., which was lower than room temperature (23° C.). However, a magnetic recording/reproduction device without a lubricant supplier was used, as in the first and second comparative examples.

Table 1 gives the results of a still test conducted on the seven exemplary configurations (P1) to (P7) described previously and illustrated in FIGS. 14A to 14D and 15A to 15C and the first to third comparative examples in the magnetic recording/reproduction devices. The test was conducted for one hour at the maximum. The still test was a still reproduction test in which still images were reproduced by repeatedly tracing the same helical track by a rotating head while the magnetic recording medium was stopped. The time in each cell of Table 1 represents the time lapsed until a blue back error was caused by a failure of the magnetic tape or magnetic recording/reproduction device.

TABLE 1

| | Configuration of lubricant supplier | | | | | | | | |
|---|---|---|---|---|---|---|---|---|---|
| | None | P1 | P2 (4 sheets) | P2 (200 sheets) | P3 | P4 | P5 | P6 | P7 |
| 1st exemplary embodiment | — | >1 H | >1 H | >1 H | >1 H | >1 H | >1 H | >1 H | >1 H |
| 2nd | — | >1 H | >1 H | >1 H | >1 H | >1 H | >1 H | >1 H | >1 H |

TABLE 1-continued

| | Configuration of lubricant supplier | | | | | | | | |
|---|---|---|---|---|---|---|---|---|---|
| | None | P1 | P2 (4 sheets) | P2 (200 sheets) | P3 | P4 | P5 | P6 | P7 |
| exemplary embodiment 3rd | — | >1 H | >1 H | >1 H | >1 H | >1 H | >1 H | >1 H | >1 H |
| exemplary embodiment 4th | — | >1 H | >1 H | >1 H | >1 H | >1 H | >1 H | >1 H | >1 H |
| exemplary embodiment 5th | — | 18 min | 27 min | 35 min | 13 min | >1 H | >1 H | >1 H | 45 min |
| exemplary embodiment 6th | — | 17 min | 28 min | 40 min | 14 min | >1 H | >1 H | >1 H | 46 min |
| exemplary embodiment 7th | — | 42 min | 38 min | 11 min | >1 H | 50 min | >1 H | >1 H | 56 min |
| exemplary embodiment 1st comparative example | 10 min | — | — | — | — | — | — | — | — |
| 2nd comparative example | 12 min | — | — | — | — | — | — | — | — |
| 3rd comparative example | 9 min | — | — | — | — | — | — | — | — |

On the first to seventh exemplary embodiments in Table 1, the still test was conducted for additional four hours on examples in which no blue back error had occurred within one hour. In the first, third and fourth exemplary embodiment, no blue back error occurred in the four hours. In the second exemplary embodiment, a blue back error occurred in 3.5 hours or longer and less than 4 hours. In the seventh exemplary embodiment, a blue back error occurred in 2 hours or longer and less than 3.5 hours. In the fifth and sixth exemplary embodiments, a blue back error occurred within 10 minutes.

When the still test was conducted on the comparative examples in an ambient temperature of 5° C., a temporary head clog occurred in all of the comparative examples. This is probably because the lubricant coat, which was in a liquid state at room temperature, became lumpy due to cooling, and the lumpy lubricant reached the magnetic head and the recording/reproduction surface of the magnetic tape.

The still test was conducted on a magnetic tape that had been stored at an ambient temperature of 40° C. for 10 days. The first to sixth exemplary embodiments provided results equivalent to those in Table 2 whereas the first to third comparative examples and the seventh exemplary embodiment (P2 (200 sheets)) caused a blue back error within 5 minutes. Since the lubricant formed on the magnetic tape had decreased due to the storage at an ambient temperature of 40° C. for 10 days, consumption of the lubricant on the surface of the magnetic tape was accelerated by the still test conducted on conventional magnetic recording/reproduction devices. In contrast, the still test conducted on the magnetic recording/reproduction devices of the present invention has shown that when lubricant in the contact-surface lubricant coat in the lubricant suppliers was partially consumed, lubricant in the noncontact-surface lubricant coat melted and was supplied.

In the fifth to seventh exemplary embodiments, a blue back error occurred within 1 hour in some examples, depending on the form of the lubricant supplier 10. However, the time lapsed until occurrence of a blue back error was generally short as compared with the first to third comparative examples. Furthermore, the examples using a compound having a melting point of 28° C. or higher (the first, second and forth exemplary embodiments) and the example using a mixture with a compound having a melting point of 28° C. or higher (the third exemplary embodiment) can prevent occurrence of a blue back error for a longer time.

By providing one type of lubricant having a melting point higher than or equal to 28° C. or multiple types of lubricants that have different melting points among which at least one has a melting point higher than or equal to 28° C. as described, the lubricant does not melt at room temperature when the device is not in operation whereas the lubricant melts at temperatures in ambient in which the device is in operation. Therefore, melting and flowing down of lubricant and non-uniform distribution of lubricant while the magnetic recording/reproduction device is not in operation can be prevented.

(Seventh Embodiment)

Figure 16:
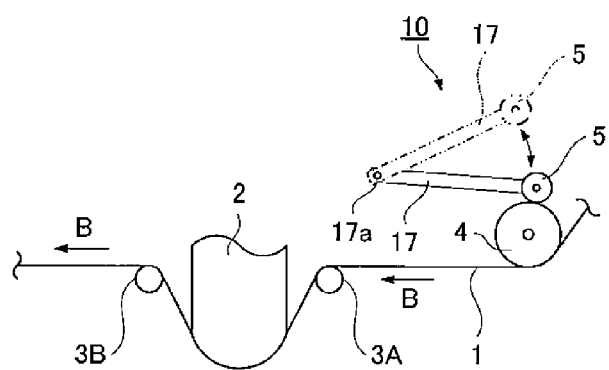
FIG. 16 is a plan view schematically illustrating a configuration of a lubricant supplier and its neighboring section in a magnetic recording/reproduction device according to a seventh embodiment of the present invention.

FIG. 16 schematically illustrates a configuration of a lubricant supplier and its neighboring section in a magnetic recording/reproduction device according to a seventh embodiment of the present invention. Like the magnetic recording/reproduction devices of the first and second embodiments, the magnetic recording/reproduction device includes a stationary (so-called linear recording) magnetic head 2 that performs recording and reproduction on a metal-thin-film magnetic tape 1 that does not contain a binder, a plurality of guide posts 3A, 3B (two in FIG. 16) which guide a magnetic tape 1 during recording and reproduction so that the magnetic tape 1 slides over the magnetic head 2, a rotating post 4 which guides the magnetic tape 1 to transfer the magnetic tape 1 toward the guide post 3A located upstream with respect to the tape traveling direction (the direction indicated by arrow B), and a lubricant supplier 10 which supplies lubricant to the magnetic tape 1. In the magnetic recording/reproduction device, as in the second embodiment, a lubricant applicator 5 provided in the lubricant supplier 10 and impregnated with lubricant does not directly contact with the magnetic tape 1 but contacts with the cylindrical rotating post 4 which slides over the magnetic tape 1 while rotating. Thus, lubricant from the lubricant applicator 5 is supplied to the magnetic tape 1 through the rotating post 4.

However, the lubricant applicator 5 in the lubricant supplier 10 of the magnetic recording/reproduction device according to the seventh embodiment is supported in such a manner that the lubricant applicator 5 is rotatable about a shaft standing at an end of a supporting member 17 which is a movable part that swings on a pivot 17a as illustrated in FIG. 16. By swinging the supporting member 17 by a driving force from a driving source, not shown, the lubricant applicator 5 can be switched between a supply position in which the lubricant applicator 5 is in contact with the rotating post 4 and supplies lubricant to the magnetic tape 1 and a non-supply position in which the lubricant applicator 5 is separated from the rotating post 4 and supplies no lubricant to the magnetic tape 1.

With this configuration, lubricant can be supplied only when needed, by swinging the movable supporting member 17 to switch the lubricant applicator 5 between the supply position and the non-supply position.

The lubricant applicator 5 may be switched to the supply position to supply lubricant at regular intervals such as once a week, or according to the operating time (the total operating time lapsed since the last supply of lubricant) or the distance (length) the magnetic tape 1 has traveled (the total distance the magnetic tape 1 has traveled since the last supply of lubricant). If the switching is made according to the total operating time or travel distance, lubricant is supplied according to the total time of reproduction and recording or the total travel distance (the tape travel length times the number of travels).

In a magnetic recording/reproduction device used for backup of a large amount of data of a server or a personal computer, one magnetic tape 1 is often used for backup in a time zone such as nighttime during which the personal computer is not used. If this is the case, lubricant may be supplied for approximately 6 hours over a length of 1000 m or more according to the frequency of use (which is equal to the number of days of use if the device is used once a day) at regular intervals, for example monthly or semiannually, so that lubricant is supplied over the full length of the magnetic tape 1 in one night. When a predetermined number of lubrication supplies (for example 5 times) are reached, preferably an amount of lubricant is added to the lubricant applicator 5. For example, an amount of lubricant is added preferably every six months or every three years.

If the lubricant supplier 10 is configured to supply lubricant to the magnetic tape 1 according to the operating time of the magnetic recording/reproduction device, lubricant can be supplied to the magnetic tape after the magnetic recording/reproduction device has operated for a long time. If the lubricant supplier 10 is configured to supply the lubricant to the magnetic tape according to the travel distance of the magnetic tape 1, the lubricant can be supplied to the magnetic tape after the magnetic tape 1 has traveled a long distance. Accordingly, the lubricant can be saved because the lubricant is not supplied to the magnetic tape 1 until the magnetic recording/reproduction device has operated for an extended period of time or the magnetic tape 1 has traveled an extended travel distance. Furthermore, an excessive supply of lubricant to a magnetic tape 1 that is likely to have a sufficient level of protective layer containing lubricant because of a short operating time of the magnetic recording/reproduction device or a short travel distance can be prevented. Consequently, entanglement of the magnetic tape 1 around the magnetic head 2 and dropouts (data losses) due to an excessive lubricant supply can be prevented.

Lubricant may be supplied to the magnetic tape 1 according to the type of the magnetic tape 1. Some magnetic tape 1 cassettes contain a memory on which data such as the name of manufacturer, product number, lot number (which often includes data such as the date of manufacture), and/or serial number of the magnetic tape 1 are stored. In the case of such a magnetic tape 1, the date of manufacture of the magnetic tape 1 may be identified by the lot number, for example and, when a predetermined period of time has elapsed since that date, lubricant may be supplied (the lubricant applicator 5 may be placed into the supply position) constantly, at regular intervals, or according to the operating time or travel distance. Alternatively, a database of a lubrication supply start date after manufacturing may be stored along with the name of manufacturer and product number of the magnetic tape 1 and lubricant may be supplied (the lubricant applicator 5 may be placed into the supply position) constantly, at regular intervals, or according to the operating time or travel distance after a predetermined time has elapsed since the date of manufacture of the magnetic tape 1 based on the name of manufacturer, product number and lot number of the magnetic tape 1 read from the database. For example, the date of manufacture of the magnetic tape 1 may be identified by the lot number and, when five or more years has elapsed since the date of manufacture, the lubricant may be supplied first time the magnetic tape 1 is used. With this configuration, lubricant can be appropriately supplied to the magnetic tape 1 whose lubricant containing protective layer has possibly worn down after a long period of use.

Alternatively, lubricant may be supplied (the lubricant applicator 5 may be placed into the supply position) when the tension of the magnetic tape 1 exceeds a predetermined value or the range of variation of the tension of wind by the magnetic recording/reproduction device in which the magnetic tape 1 moves at a constant speed during recording/reproduction exceeds a predetermined value. For example, in a magnetic recording/reproduction device that controls the load on the motor that drives the magnetic tape 1 by using an electric current value, the tension value may be estimated from the electric current value of the motor and, when the tension value exceeds a reference value (for example 1N) by 5% or more, lubricant supply may be started. Alternatively, when the range of variation of the tension for moving the magnetic tape 1 at a constant speed during recording/reproduction exceeds ±1% of a reference value, lubricant supply may be started. Even when the tension or the range of variation of tension of the magnetic tape 1 exceeds a predetermined value only partially, the lubricant is provided to the full width of the magnetic tape 1. With this configuration, the lubricant can be appropriately supplied to the magnetic tape 1 when the tension exceeds the predetermined value or when the range of variation of tension increases due to wear of the lubricant containing protective layer.

The configuration that places the lubricant applicator 5 into the supply position to supply lubricant at regular intervals, or on the basis of operating time, travel distance, tension, or type of the magnetic tape 1 may be used in any of the third to sixth embodiments as well.

(Eighth Embodiment)

Figure 17:
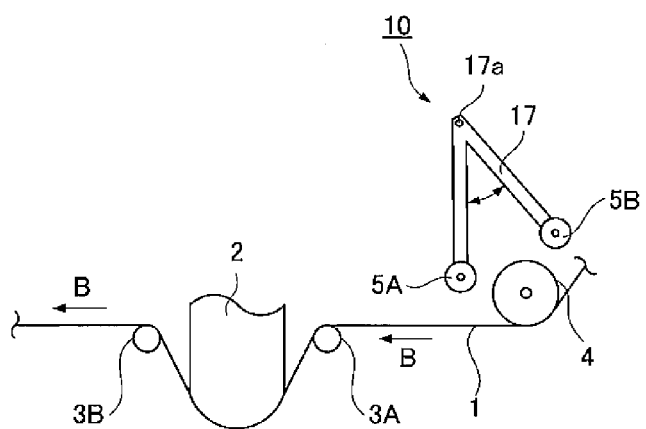
FIG. 17 is a plan view schematically illustrating a configuration of a configuration of a lubricant supplier and its neighboring section in a magnetic recording/reproduction device according to an eighth embodiment of the present invention.

FIG. 17 schematically illustrates a configuration of a lubricant supplier and its neighboring section in a magnetic recording/reproduction device according to an eighth embodiment of the present invention. In the magnetic recording/reproduction device, first and second lubricant applicators 5A and 5B which contain lubricants having different melting points are rotatably attached to the ends of a two-pronged supporting member 17. The supporting member 17 is swung by the driving force from a driving source, not shown, to switch the supporting member 17 among three positions: a first supply position in which the first lubricant applicator 5A comes into contact with a rotating post 4 to supply a first lubricant to a magnetic tape 1, a second supply position in which the second lubricant applicator 5A comes into contact with the rotating post 4 to supply a second lubricant to the magnetic tape 1, and a non-supply position in which the first and second lubricant applicator 5A and 5D are separated from the rotating post 4 and neither of them supply lubricant to the magnetic tape 1. A temperature sensor, not shown, is provided in the location of the lubricant supplier 10. The temperature sensor senses the temperature in the ambience in which the lubricant supplier 10 is provided. The lubricant contained in the first lubricant applicator 5A has a melting point lower than the lubricant contained in the second lubricant applicator 5B. For example, the melting point of the lubricant contained in the first lubricant applicator 5A may be 25° C. and the melting point of the lubricant contained in the second lubricant applicator 5B may be 35° C.

When no lubricants need to be supplied, the supporting member 17 is placed into the non-supply position. On the other hand, when lubricant needs to be supplied and the temperature in the location of the lubricant supplier 10 sensed by the temperature sensor is lower than the melting point of the second lubricant, the supporting member 17 is placed into the first supply position to bring the first lubricant applicator 5A containing the lower-melting-point lubricant into contact with the rotating post 4 to supply the lower-melting-point lubricant to the magnetic tape 1 through the rotating post 4. When lubricant needs to be supplied and the temperature in the location of the lubricant supplier 10 sensed by the temperature sensor is higher than or equal to the melting point of the second lubricant, the supporting member 17 is placed into the second supply position to bring the second lubricant applicator 5B containing the higher-melting-point lubricant into contact with the rotating post 4 to supply the higher-melting-point lubricant to the magnetic tape 1 through the rotating post 4.

With this configuration, one of the lubricants that is appropriate for the temperature in the location of the lubricant supplier 10 can be selected and supplied to the magnetic tape 1. If a lubricant having a low melting point is supplied when the temperature in the location of the lubricant supplier 10 is high, an excessive lubricant would be supplied to the magnetic tape 1 and the magnetic tape 1 is likely to be entangled around the magnetic head 2 or dropouts (data losses) can occur. The configuration can prevent these problems. When the temperature in the location of the lubricant supplier 10 is low, the lower-melting-point lubricant is supplied. This configuration can prevent an unmelted, solid-state lubricant from contacting the rotating post 4 to damage the rotating post 4.

Figure 18:
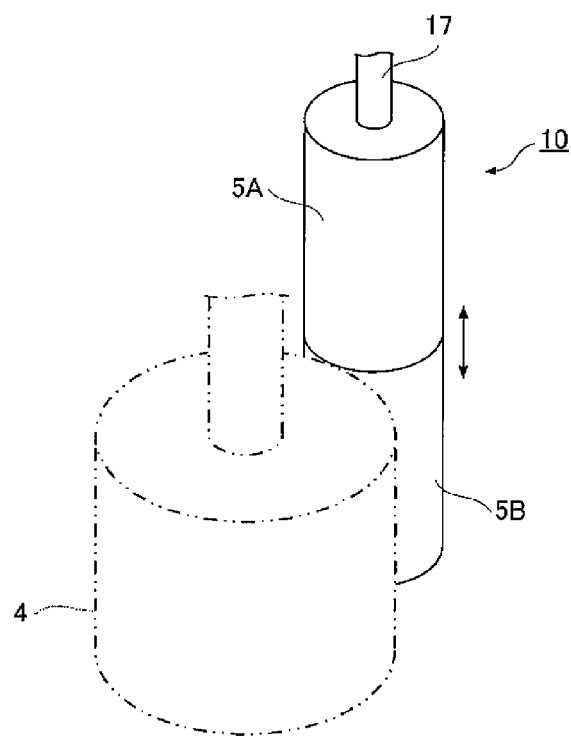
FIG. 18 is a plan view schematically illustrating a configuration of a lubricant supplier and its neighboring section in a magnetic recording/reproduction device according to a variation of the eighth embodiment of the present invention.

In the magnetic recording/reproduction device, the two-pronged supporting member 17 is swung to switch the supporting member 17 among the first supply position, the second supply position and the non-supply position. Alternatively, the cylindrical first and second lubricant applicators 5A and 5B containing lubricants having different melting points may be arranged along the center of a shaft as illustrated in FIG. 18. A supporting member (supporting shaft) that rotatably supports the lubricant applicators 5A and 5B may be moved up and down to switch among the first supply position (in which the first lubricant applicator 5A comes into contact with the rotating post 4), the second supply position (in which the second lubricant applicator 5B comes into contact with the rotating post 4), and non-supply position (in which neither of the lubricant applicators 5A and 5B comes into contact with the rotating post 4) (a variation of the eighth embodiment). The variation has the same effects as the embodiments described previously. While the two lubricant applicators 5A and 5B in FIG. 18 are arranged along the center of the shaft, the arrangement is not limited to this. Three or more lubricant applicators containing lubricants having different melting points may be arranged along the center of a shaft and switching may be made among positions in which the lubricant applicators come into contact with the rotating post 4 and a position in which none of the lubricant applicators comes into contact with the rotating post 4 according to the temperature sensed by the temperature sensor.

(Ninth Embodiment)

Figure 19:
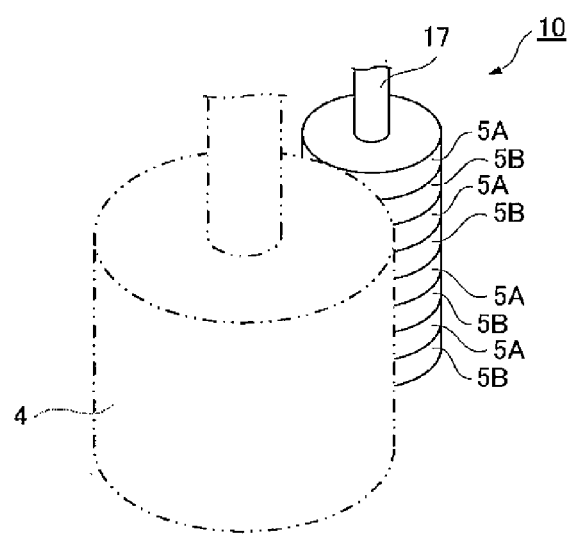
FIG. 19 is a plan view schematically illustrating a configuration of a lubricant supplier and its neighboring section in a magnetic recording/reproduction device according to a ninth embodiment of the present invention.

FIG. 19 schematically illustrates a configuration of a lubricant supplier and its neighboring section in a magnetic recording/reproduction device according to a ninth embodiment of the present invention. In the magnetic recording/reproduction device, a lubricant applicator 5 that contacts with a rotating post 4 include multiple narrow lubricant applicators 5A, 5B containing two types of lubricants having different melting points alternately arranged along the center of a shaft. The entire lubricant applicator 5 is the same in height as the rotating post 4. When the temperature in the location of the lubricant applicator 5 is low (for example, when the temperature is higher than the melting point of the lubricant of the first lubricant applicator 5A but lower than the melting point of the lubricant of the second lubricant applicator 5B), only the lubricant of the first lubricant applicator 5A melts and is supplied to a magnetic tape 1 through the rotating post 4. On the other hand, when the temperature in the location of the lubricant applicator 5 is high (the temperature is higher than the melting points of the lubricants of both lubricant applicators 5A and 5B), the lubricants of both lubricant applicators 5A and 5B are supplied to the magnetic tape 1 through the rotating post 4. That is, the area of regions where melted lubricants are supplied can be changed according to the temperature. More specifically, the area where melted lubricants are supplied increases as the temperature in the location of the lubricant supplier 10 (the lubricant applicator 5) increases.

With this configuration, for example, when the temperature in the location of the lubricant supplier 10 (the lubricant applicators 5A, 5B) is low, lubricant is supplied only from portions of the lubricant applicator 5. On the other hand, when the temperature in the location of the lubricant supplier 10 (the lubricant applicators 5A, 5B) is high, lubricant is supplied from all regions of the lubricant applicator 5. While the lubricant applicators 5A and 5B with different melting points are alternately arranged in FIG. 19, the arrangement is not limited to this. Three or more types of lubricant applicators having different melting points may be provided. In such cases, the area of regions where melted lubricants are supplied increases and more lubricant is supplied as the temperature increases. This configuration has the advantage of eliminating the need for a temperature sensor like the one in the eight embodiment.

While the lubricant applicator 5 in any of the first, second and seventh to ninth embodiments described is tubular, the lubricant applicator 5 is not limited to this. A lubricant applicator like those illustrated in FIGS. 3A to 15 may be used instead of the tubular lubricant applicator 5.

INDUSTRIAL APPLICABILITY

A magnetic recording/reproduction device according to the present invention is applicable to not only a helical scan format in which a magnetic head rotates together with a rotating drum but also a linear recording format in which a magnetic head is stationary. A magnetic recording/reproduction device including a lubricant supplier according to the present invention can be used with a metal-thin-film magnetic tape and with a magnetoresistive head. A magnetic recording/reproduction device including a lubricant supplier according to the present invention enables good electromagnetic conversion for metal-thin-film magnetic recording media using a magnetic head such as a magnetoresistive head, which was impossible in the past, and also technically facilitates reduction in size and increase in recording density of metal-thin-film magnetic tape and is applicable to different formats as well.

The invention claimed is:

1. A magnetic recording/reproduction device which supplies lubricant to a metal-thin-film magnetic tape containing no binder in recording/reproduction surface thereof, the magnetic recording/reproduction device comprising:
    a magnetic head; and
    a lubricant supplier which can supply lubricant to the magnetic tape during recording/reproduction on the magnetic tape by means of the magnetic head,
    the lubricant supplier comprising a movable part that can switch between a supplying position in which the lubricant supplier can supply the lubricant to the magnetic tape and a non-supplying position in which the lubricant supplier does not supply the lubricant to the magnetic tape.

2. The magnetic recording/reproduction device according to claim 1, further comprising a rotating post sliding over the magnetic tape, wherein:
    the lubricant supplier has a portion which contacts with the rotating post and supplies the lubricant to the magnetic tape through the rotating post.

3. The magnetic recording/reproduction device according to claim 1, wherein:
    the magnetic head is a rotatable magnetic head which slides over the magnetic tape and supplies the lubricant to the magnetic tape, and
    the lubricant supplier has a portion which contacts with the magnetic head and supplies the lubricant to the magnetic tape through the magnetic head.

4. The magnetic recording/reproduction device according to claim 1, wherein the lubricant supplier contains one lubricant or a plurality of lubricants having different melting points, the melting point of the one lubricant or at least one of the plurality of lubricants is higher than or equal to 28° C.

5. The magnetic recording/reproduction device according to claim 1, wherein the lubricant supplier comprises a attachable and removable cartridge containing lubricant.

6. The magnetic recording/reproduction device according to claim 1, wherein the lubricant supplier contains a plurality of lubricants having different melting points, and contains a temperature sensor which senses temperature in a location where the lubricant supplier is disposed, supplies lubricant selected according to the temperature sensed by the temperature sensor.

7. The magnetic recording/reproduction device according to claim 1, wherein the lubricant supplier comprises a plurality of supplying surfaces containing respective lubricants having different melting points, and the plurality of supplying surfaces being arranged so that the area of the supplying surface on which the lubricant is melted can be changed according to the temperature in the location the lubricant supplier.

8. The magnetic recording/reproduction device according to claim 1, wherein the lubricant supplier constantly supplies the lubricant to the magnetic tape.

9. The magnetic recording/reproduction device according to clam 1, wherein the lubricant supplier supplies the lubricant to the magnetic tape at regular intervals.

10. The magnetic recording/reproduction device according to claim 1, wherein the lubricant supplier supplies the lubricant to the magnetic tape according to a length which the magnetic tape has traveled.

11. The magnetic recording/reproduction device according to claim 1, wherein the lubricant supplier supplies the lubricant to the magnetic tape according to at least one of a type of the magnetic tape and a manufacturing date of the magnetic tape.

12. The magnetic recording/reproduction device according to claim 1, wherein the lubricant supplier supplies the lubricant to the magnetic tape according to tension of the magnetic tape.

13. The magnetic recording/reproduction device according to claim 1, wherein the lubricant supplier supplies the lubricant to the magnetic tape according to a load on a motor for moving the magnetic tape.

14. A magnetic recording/reproduction device which supplies lubricant to a metal-thin-film magnetic tape containing no binder in recording/reproduction surface thereof, the magnetic recording/reproduction device comprising:
    a magnetic head; and
    a lubricant supplier which can supply lubricant to the magnetic tape during recording/reproduction on the magnetic tape by means of the magnetic head, wherein:
    the magnetic head is a rotatable magnetic head which slides over the magnetic tape and supplies the lubricant to the magnetic tape,
    the lubricant supplier has a portion which contacts with the magnetic head and supplies the lubricant to the magnetic tape through the magnetic head,
    the lubricant supplier has a contact-surface lubricant coat formed on a surface contacting with the magnetic head and a noncontact-surface lubricant coat formed contiguously with the contact-surface lubricant coat; and
    the noncontact-surface lubricant coat is configured so that lubricant contained in the noncontact-surface lubricant coat melts at a temperature higher than or equal to a melting point of the lubricant to move and be supplied to the contact-surface lubricant coat, wherein the amount of lubricant supplied to the magnetic head is according to the decreasing amount of lubricant in contact-surface lubricant coat supplied to the magnetic head.

15. The magnetic recording/reproduction device according to claim 14, wherein:
    the lubricant supplier includes a flexible thin-plate having a lubricant coat formed on a surface thereof, the flexible thin-plate being configured so that the surface on which the lubricant coat is formed faces to the magnetic head, and a first portion of the surface on which the lubricant coat is formed comes into contact with the magnetic head, and the contact-surface lubricant coat is formed on the first portion, and that a second portion does not contact with the magnetic head, and the noncontact-surface lubricant coat is formed on the second portion.

16. The magnetic recording/reproduction device according to claim 14, wherein:
    the lubricant supplier is configured as a solid block including at least one projection on which a lubricant coat is formed on a surface so that the projection faces to the magnetic head and comes into contact with the magnetic head, and the contact-surface lubricant coat is formed on the projection, and the lubricant supplier has a portion of the lubricant coat that does not contact the magnetic head, and the noncontact-surface lubricant coat is formed on the portion.

* * * * *